(12) United States Patent
Fukushima

(10) Patent No.: US 11,093,131 B2
(45) Date of Patent: Aug. 17, 2021

(54) ELECTRONIC DEVICE, CONTROL METHOD OF ELECTRONIC DEVICE, AND NON-TRANSITORY COMPUTER READABLE MEDIUM

(71) Applicant: CANON KABUSHIKI KAISHA, Tokyo (JP)

(72) Inventor: Yuki Fukushima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/858,364

(22) Filed: Apr. 24, 2020

(65) Prior Publication Data

US 2020/0341630 A1 Oct. 29, 2020

(30) Foreign Application Priority Data

Apr. 26, 2019 (JP) .............................. JP2019-085185

(51) Int. Cl.
*G06F 3/0488* (2013.01)
*G06F 3/01* (2006.01)

(52) U.S. Cl.
CPC .......... *G06F 3/04883* (2013.01); *G06F 3/016* (2013.01)

(58) Field of Classification Search
None
See application file for complete search history.

(56) References Cited

U.S. PATENT DOCUMENTS

| 2002/0030668 | A1* | 3/2002 | Hoshino | G06F 3/0421 345/175 |
| 2002/0078393 | A1* | 6/2002 | Parker | G06F 1/1626 713/324 |
| 2002/0155857 | A1 | 10/2002 | Nishimoto | |
| 2010/0134433 | A1 | 6/2010 | Miyanishi | |

(Continued)

FOREIGN PATENT DOCUMENTS

JP  2002-318661 A  10/2002
WO  2018/021165 A1  2/2018

OTHER PUBLICATIONS

The above patent documents were cited in a European Search Report dated Sep. 9, 2020, which is enclosed, that issued in the corresponding European Patent Application No. 20171245.2.

*Primary Examiner* — Christopher J Kohlman
(74) *Attorney, Agent, or Firm* — Cowan, Liebowitz & Latman, P.C.

(57) ABSTRACT

An electronic device, comprising: a movement detector configured to detect a movement of a finger on an operation surface of an operation member; a press detector configured to detect a pressing the operation surface; a control unit configured to perform control so as to move an indicator on the basis of a movement of a finger detected by the movement detector and execute predetermined processing on the basis of a position of the indicator in accordance with a pressing the operation surface detected by the press detector; a setting unit configured to set a restricted state where function execution due to a pressing the operation surface is restricted; and a processing unit configured to prevent the control unit from moving the indicator on the basis of a detection by the movement detector in case where the restricted state is set by the setting unit.

12 Claims, 12 Drawing Sheets

(56) References Cited

U.S. PATENT DOCUMENTS

2012/0013536 A1\* 1/2012 VanDuyn .............. G06F 3/0231
345/169
2017/0104921 A1 4/2017 Yoshida et al.
2017/0195553 A1\* 7/2017 Shiozaki .......... H04N 5/232933

\* cited by examiner

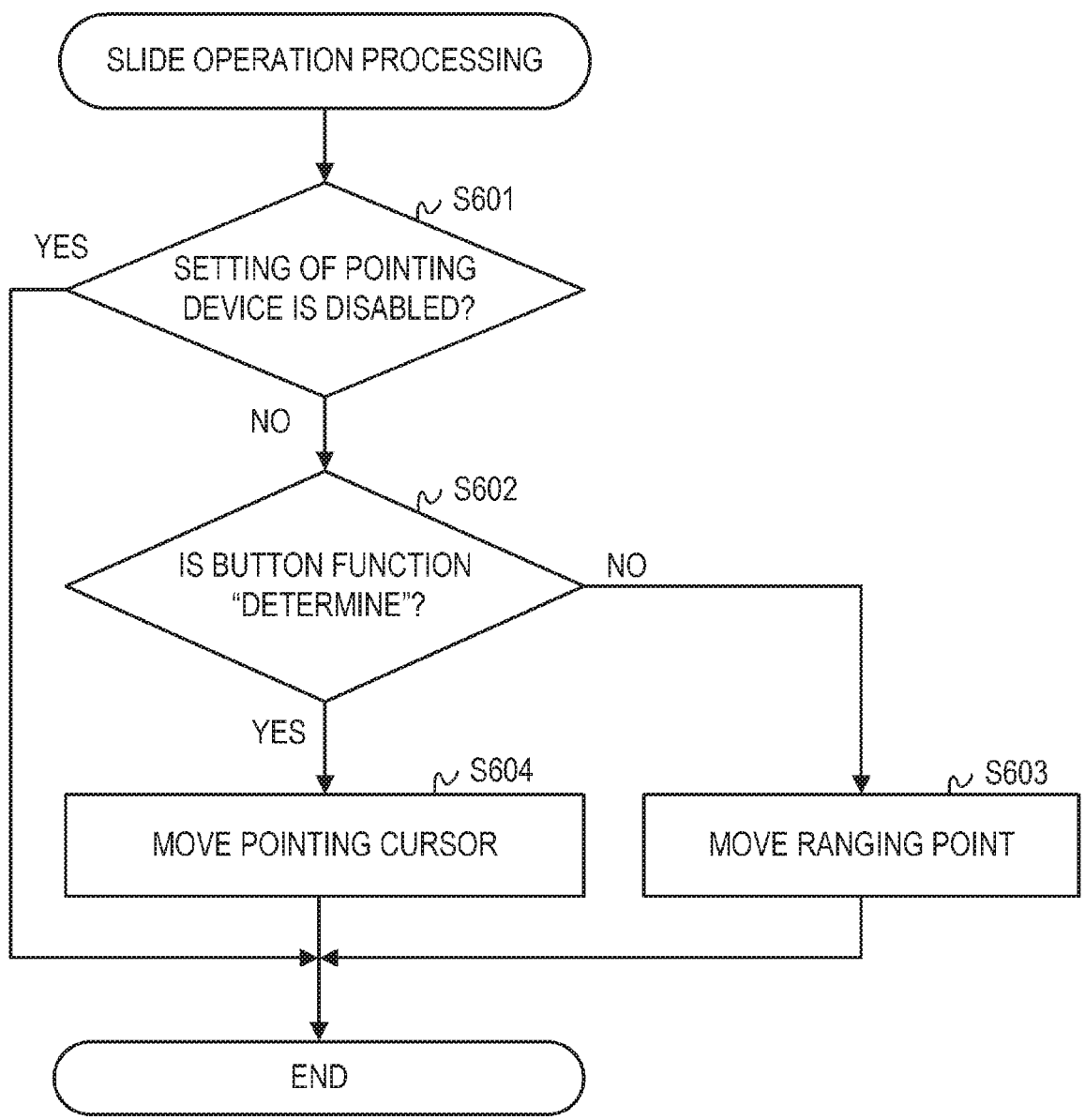

… (US 11,093,131 B2)

ELECTRONIC DEVICE, CONTROL METHOD OF ELECTRONIC DEVICE, AND NON-TRANSITORY COMPUTER READABLE MEDIUM

BACKGROUND OF THE INVENTION

Field of the Invention

The present invention relates to an electronic device, a control method of an electronic device, and a non-transitory computer readable medium.

Description of the Related Art

Conventionally, operation devices capable of detecting a movement of a finger on an operation surface and detecting a push-in with respect to the operation surface are known.

Japanese Patent Application Laid-open No. 2002-318661 describes a configuration in which an optical sensor for detecting a movement amount of a finger is built into a push button switch mounted to a small mobile terminal. Japanese Patent Application Laid-open No. 2002-318661 proposes selecting necessary information by positioning a pointer on the information by a movement of a finger having been brought into contact with the push button switch and subsequently pushing in the switch with the finger.

A tentative case where a function of the push button switch as a switch is set to disabled in the technique disclosed in Japanese Patent Application Laid-open No. 2002-318661 will now be described. In this case, while processing (for example, a movement of a pointer) on the basis of a movement operation of a finger is executed, processing (for example, selection of the information indicated by the pointer) on the basis of a push-in is not executed even when a push-in is performed. Although a user can perform processing (a pointer movement) in accordance with the movement operation, processing (selection) in accordance with the push-in is not executed. Therefore, there is a possibility that a device defect instead of a disable setting may be misconstrued as a reason for the processing in accordance with the push-in not being executed.

SUMMARY OF THE INVENTION

An object of the present invention is to provide an electronic device which, when two operations are possible with respect to one operation member, prevents a user from misconstruing enable/disable settings of functions corresponding to the two operations.

An aspect of the invention is:

an electronic device, comprising:

a movement detector configured to detect a movement of a finger on an operation surface of an operation member;

a press detector configured to detect a pressing the operation surface of the operation member;

at least one memory and at least one processor which function as:

a control unit configured to perform control so as to 1) move an indicator on the basis of a movement of a finger detected by the movement detector and 2) execute predetermined processing on the basis of a position of the indicator in accordance with a pressing the operation surface detected by the press detector;

a setting unit configured to set a restricted state where function execution due to a pressing the operation surface is restricted; and a processing unit configured to prevent the control unit from moving the indicator on the basis of a detection by the movement detector in case where the restricted state is set by the setting unit.

Further features of the present invention will become apparent from the following description of exemplary embodiments with reference to the attached drawings.

BRIEF DESCRIPTION OF THE DRAWINGS

FIG. 6 is a flow chart showing slide operation processing according to the embodiment;

DESCRIPTION OF THE EMBODIMENTS

Figure 1A:
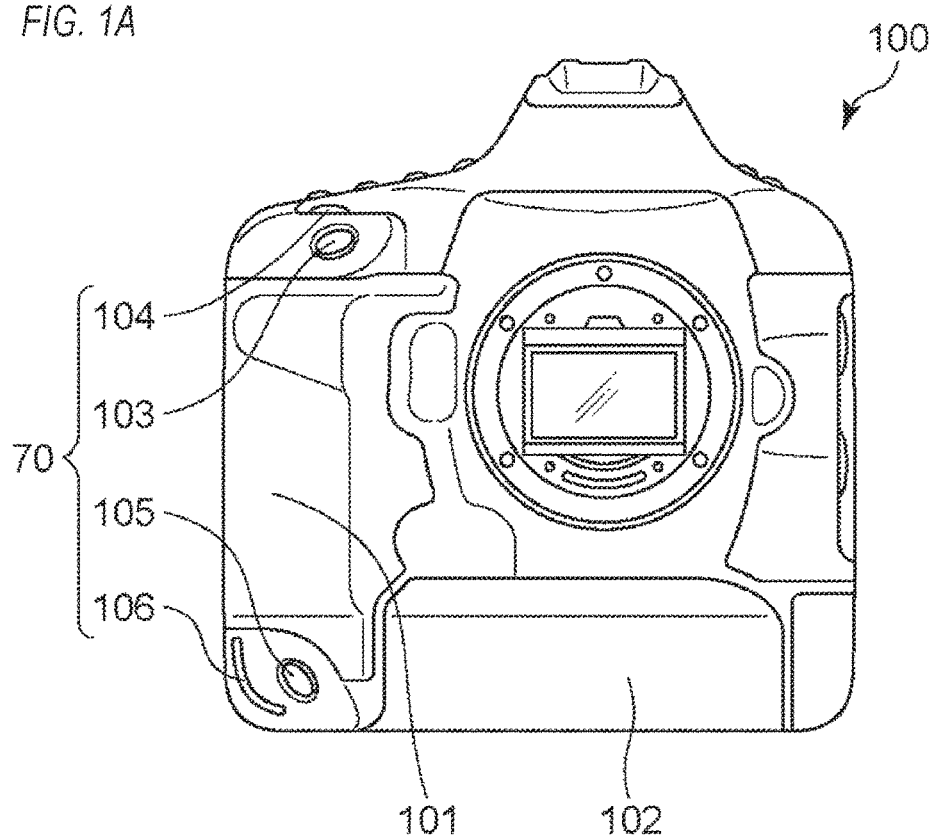
FIGS. 1A and 1B are external views of a camera according to an embodiment.
Figure 1B:
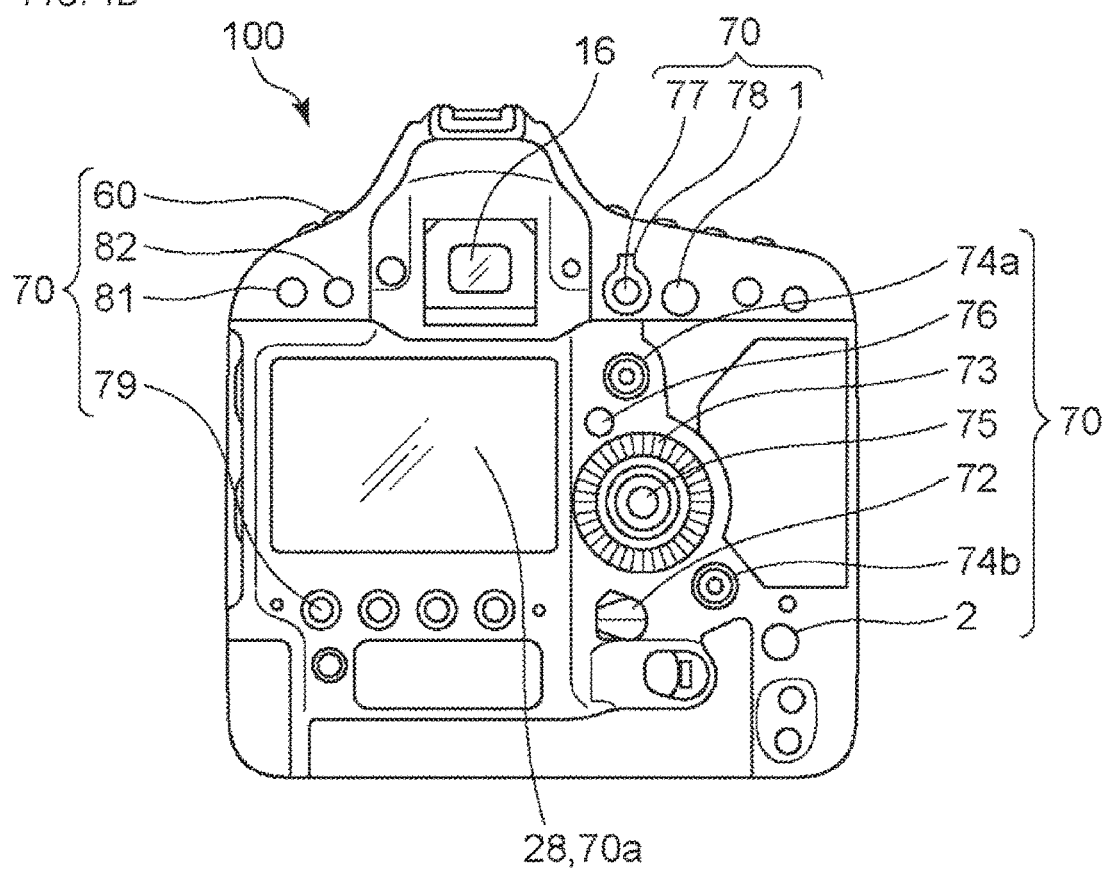

Hereinafter, a preferred embodiment of the present invention will be described in detail with reference to the accompanying drawings. FIGS. 1A and 1B are external views of a main body of a single-lens reflex camera (hereinafter, referred to as a camera) 100 as an example of an imaging apparatus (which is an electronic device) to which the present invention is applicable. Specifically, FIG. 1A is a diagram in which the camera 100 is viewed from a first surface (a front surface) side and which shows a state where a photographing lens unit has been removed. FIG. 1B is a diagram in which the camera 100 is viewed from a second surface (a rear surface). The first surface is a camera front surface which is a surface on an object side (a surface on a side of an image sensing direction). The second surface is a rear surface of the camera which is a surface on a rear side (opposite side) of the first surface and a surface on a side of a photographer who looks into a finder 16.

As shown in FIG. 1A, the camera 100 is provided with a first grip portion 101 that protrudes forward so that a user of the camera 100 can grasp and handle the camera 100 in a stable manner when performing photography while laterally holding the camera 100. In addition, the camera 100 is provided with a second grip portion 102 that protrudes forward so that the user of the camera 100 can grasp and handle the camera 100 in a stable manner when performing photography while vertically holding the camera 100. The first grip portion 101 is parallel to a first side (a side on a left side among two vertical sides to the left and right in FIG. 1A) of the front surface of the camera 100, and the second grip portion 102 is parallel to a second side (a side on a lower side among two lateral sides at the top and bottom in FIG. 1A) which is adjacent to the first side of the front surface. Shutter buttons 103 and 105 are operating members for issuing photography instructions. Main electronic dials 104 and 106 are rotating operating members and, by turning the main electronic dials 104 and 106, setting values such as a shutter speed and an aperture can be changed. The shutter buttons 103 and 105 and the main electronic dials 104 and 106 are included in an operating unit 70. The shutter button 103 and the main electronic dial 104 can be mainly used for laterally-held photography and the shutter button 105 and the main electronic dial 106 can be mainly used for vertically-held photography.

In FIG. 1B, a display unit 28 displays images and various types of information. The display unit 28 is provided so as to be superimposed on, or integrated with, a touch panel 70a that is capable of accepting a touch operation (capable of touch detection). AF-ON buttons 1 and 2 are operating members for setting a focal adjustment position or starting AF and are included in the operating unit 70. In the present embodiment, the AF-ON buttons 1 and 2 are touch operation members (in the present embodiment, infrared sensors) capable of accepting a touch operation and a depressing operation. Such an operating member adopting an optical system will be referred to as an optical tracking pointer (OTP). While laterally holding the camera 100 (in a state where the camera 100 is held at a lateral position) and looking into the finder 16, the user can perform a touch operation or a slide operation in any two-dimensional direction with respect to the AF-ON button 1 using the thumb of the right hand that is gripping the first grip portion 101. In addition, while vertically holding the camera 100 and looking into the finder 16, the user can perform a touch operation or a slide operation in any two-dimensional direction with respect to the AF-ON button 2 using the thumb of the right hand that is gripping the second grip portion 102. Vertically holding the camera 100 refers to a state where the camera 100 is held at a vertical position that differs from the lateral position by 90 degrees. With a slide operation with respect to the AF-ON button 1 or the AF-ON button 2, the user operating the camera 100 can move a ranging point frame (a position of an AF frame used for AF, a focal adjustment position, a focus detection position) displayed on the display unit 28. In addition, with a depressing operation with respect to the AF-ON button 1 or the AF-ON button 2, the user can immediately start AF on the basis of the position of the ranging point frame. The AF-ON button 1 can be mainly used for laterally-held photography and the AF-ON button 2 can be mainly used for vertically-held photography.

An arrangement of the AF-ON buttons 1 and 2 will be described. As shown in FIG. 1B, the AF-ON buttons 1 and 2 are disposed on a rear surface of the camera 100. In addition, the AF-ON button 2 is disposed at a position that is closer to a vertex formed by a side (the first side) parallel to the first grip portion 101 and a side (the second side) parallel to the second grip portion 102 than to other vertices among the rear surface of the camera 100. Furthermore, the AF-ON button 2 is disposed at a position that is closer to the vertex formed by the side parallel to the first grip portion 101 and the side parallel to the second grip portion 102 than to the AF-ON button 1. The side (the first side) parallel to the first grip portion 101 among the rear surface of the camera 100 is a side on a right side among two vertical sides to the left and right in FIG. 1B. The side (the second side) parallel to the second grip portion 102 among the rear surface of the camera 100 is a side on a lower side among two lateral sides at the top and the bottom in FIG. 1B. In this case, when the rear surface of the camera 100 is considered a polygon, the vertex described above is a vertex of the polygon (a virtual vertex). If the rear surface of the camera 100 is a perfect polygon, the vertex described above may be a vertex of the polygon (an actual vertex of the camera 100). The first side is a side (a vertical side) on the right side in a left-right direction in FIG. 1B, the second side is a side (a lateral side) on the lower side in an up-down direction in FIG. 1B, and the vertex described above which is formed by the first side and the second side is a lower right vertex in FIG. 1B. Furthermore, the AF-ON button 2 is disposed at a position that is closer to an end (a lower end) on an opposite side than to an end (in other words, an upper end) on a side where the AF-ON button 1 is present among the side (the first side) parallel to the first grip portion 101. In addition, the shutter button 103 described earlier is disposed at a position where the shutter button 103 can be operated (can be depressed) by the index finger of the right hand gripping the first grip portion 101, and the shutter button 105 described earlier is disposed at a position where the shutter button 105 can be operated by the index finger of the right hand gripping the second grip portion 102. Furthermore, the AF-ON button 1 is disposed at a position that is closer to the shutter button 103 than the AF-ON button 2 is, and the AF-ON button 2 is disposed at a position that is closer to the shutter button 105 than the AF-ON button 1 is.

It should be noted that the AF-ON buttons 1 and 2 are operating members that differ from the touch panel 70a and are not equipped with a display function. In addition, while an example in which an indicator (an AF frame) which indicates a ranging position selected by an operation with respect to the AF-ON buttons 1 and 2 is to be moved will be described below, a function that is executed in response to an operation with respect to the AF-ON buttons 1 and 2 is not particularly limited. For example, the indicator to be moved by a slide operation with respect to the AF-ON buttons 1 and 2 may be any indicator as long as the indicator can be displayed on the display unit 28 and can be moved. For example, the indicator may be a pointing cursor such as a mouse cursor or a cursor that indicates a selected option among a plurality of options (such as a plurality of items displayed on a menu screen). Different indicators may be moved by a slide operation with respect to the AF-ON button 1 and a slide operation with respect to the AF-ON button 2. Functions to be executed by a depressing operation with respect to the AF-ON buttons 1 and 2 may be other functions related to functions to be executed by a slide operation with respect to the AF-ON buttons 1 and 2.

A mode changeover switch 60 is an operating member for switching between various modes. A power supply switch 72 is an operating member for switching a power supply of the camera 100 on and off. A sub electronic dial 73 is a rotating operating member for moving a selection frame, scrolling through images, and the like. 8-way keys 74a and 74b are, respectively, operating members which can be detruded in upward, downward, leftward, rightward, upward left, downward left, upward right, and downward right directions and which enable processing in accordance with a direction in which the 8-way keys 74a and 74b are detruded to be performed. The 8-way key 74a can be mainly used for laterally-held photography and the 8-way key 74b can be mainly used for vertically-held photography. A SET button 75 is an operating member which is mainly used to determine a selected item and the like. A still image/moving image changeover switch 77 is an operating member for switching between a still image photography mode and a moving image photography mode. An LV button 78 is an operating member for switching a live view (hereinafter, an LV) on and off. When LV is switched on, an LV mode is entered in which a mirror 12 (to be described later) moves (mirror-up) to a retracted position where the mirror 12 retracts from an optical axis, object light is guided to an imaging unit 22 (to be described later), and sensing of an LV image is performed. In the LV mode, an object image can be confirmed by an LV image. When LV is switched off, an OVF mode is entered in which the mirror 12 moves (mirror-down) onto the optical axis and the object light is reflected, the object light is guided to the finder 16, and an optical image of the object (an optical object image) becomes visible from the finder 16. A playback button 79 is an operating member for switching between a photography mode (a photography screen) and a playback mode (a playback screen). By depressing the playback button 79 in the photography mode, a transition can be made to the playback mode and a latest image among images recorded in a recording medium 200 (to be described later with reference to FIG. 2) can be displayed on the display unit 28. A Q button 76 is an operating member for configuring a quick setting and, by depressing the Q button 76 on the photography screen, setting items having been displayed as a list of setting values becomes selectable and, by selecting the setting items, a transition can be made to setting screens of the respective setting items. The mode changeover switch 60, the power supply switch 72, the sub electronic dial 73, the 8-way keys 74a and 74b, the SET button 75, the Q button 76, the still image/moving image changeover switch 77, the LV button 78, and the playback button 79 are included in the operating unit 70. A menu button 81 is an operating member which is included in the operating unit 70 and which is used to configure various settings of the camera 100. When the menu button 81 is pushed, a menu screen enabling various settings to be configured is displayed on the display unit 28. The user can intuitively configure various settings using the menu screen displayed on the display unit 28 together with the sub electronic dial 73, the 8-way keys 74a and 74b, the SET button 75, and the main electronic dials 104 and 106. The finder 16 is a look-in (eyepiece-type) finder for checking a focus and a composition of an optical image of an object obtained through a lens unit. An INFO button 82 is included in the operating unit 70 and is capable of displaying various types of information of the camera 100 on the display unit 28.

Figure 2:
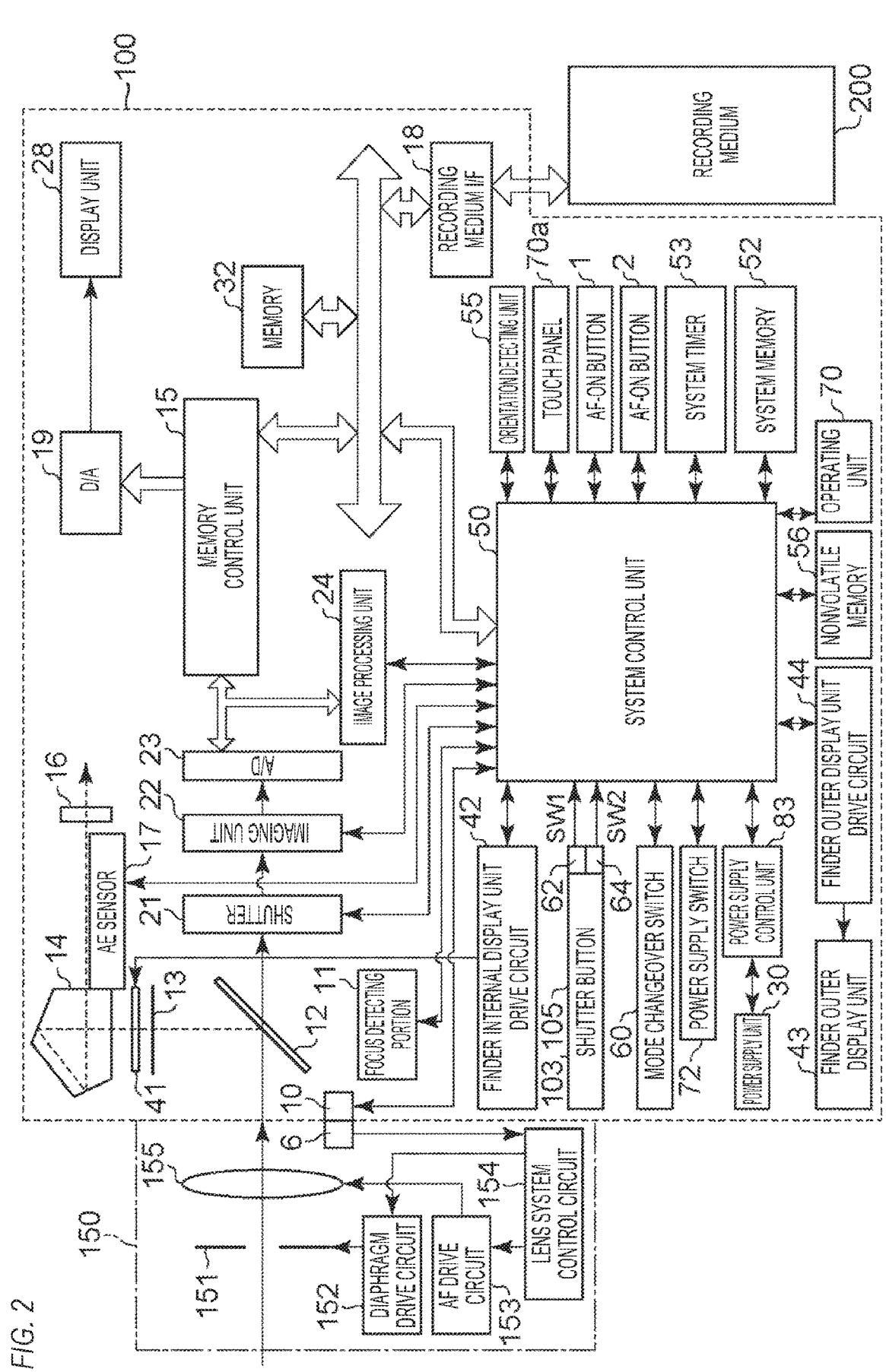
FIG. 2 is a block diagram showing a configuration example of the camera according to the embodiment.

FIG. 2 is a block diagram showing a configuration example of the camera 100.

A lens unit 150 is a lens unit mounted with a replaceable photographing lens. While a lens 155 is usually configured by a plurality of lenses such as a focusing lens group or a zoom lens group, in FIG. 2, the lens 155 is shown simplified with only one lens. A communication terminal 6 is a communication terminal used by the lens unit 150 to communicate with the camera 100, and the communication terminal 10 is a communication terminal used by the camera 100 to communicate with the lens unit 150. The lens unit 150 communicates with a system control unit 50 via the communication terminals 6 and 10. Furthermore, the lens unit 150 performs focusing by using an internal lens system control circuit 154 to control a diaphragm 151 via a diaphragm drive circuit 152 and displace a position of the lens 155 via an AF drive circuit 153. The lens unit 150 is mounted to a main body side that includes the display unit 28 via a mounting portion that enables the lens unit 150 to be mounted. As the lens unit 150, lens units of various types such as a prime lens or a zoom lens can be mounted.

An AE sensor 17 measures brightness of the object (object light) of which an image is formed on a focusing screen 13 through the lens unit 150 and a quick return mirror 12.

A focus detecting unit 11 is a phase difference detection system AF sensor which senses an image (object light) incident via the quick return mirror 12 and which outputs defocus amount information to the system control unit 50. The system control unit 50 controls the lens unit 150 on the basis of the defocus amount information to perform phase difference AF. A method of AF is not limited to phase difference AF and may instead be contrast AF. In addition, phase difference AF may be performed on the basis of a defocus amount detected on an image sensing surface of the imaging unit 22 (image sensing surface phase difference AF) instead of using the focus detecting unit 11.

The quick return mirror 12 (hereinafter, the mirror 12) is raised and lowered by an actuator (not illustrated) under instructions from the system control unit 50 during exposure, live view photography, and moving image photography. The mirror 12 is a mirror for switching a luminous flux incident from the lens 155 between a side of the finder 16 and a side of the imaging unit 22. While the mirror 12 is normally disposed so as to guide (reflect) the luminous flux to the finder 16 (mirror down), when photography and live view display are performed, the mirror 12 is flipped upward so as to guide the luminous flux to the imaging unit 22 and is retracted from inside the luminous flux (mirror up). In addition, the mirror 12 is configured as a half mirror so that light can be partially transmitted through a central portion thereof, and the mirror 12 causes a part of the luminous flux to be transmitted and incident to the focus detecting unit 11 for performing focus detection.

By observing an image formed on the focusing screen 13 via a pentaprism 14 and the finder 16, the user can check a focal state and a composition of an optical image of an object obtained through the lens unit 150.

A focal plane shutter 21 (a shutter 21) is for controlling an exposure time of the imaging unit 22 under the control of the system control unit 50.

The imaging unit 22 is an image sensing element (an image sensor) constituted by a device such as a CCD or a CMOS which converts an optical image into an electrical signal. An A/D converter 23 is used to convert an analog signal output from the imaging unit 22 into a digital signal.

An image processing unit 24 performs predetermined processing (pixel interpolation, resizing processing such as reduction, and color conversion processing) with respect to data from the A/D converter 23 or data from a memory control unit 15. In addition, the image processing unit 24 performs predetermined computing processing using image data of a captured image, and the system control unit 50 performs exposure control and ranging control based on a computation result obtained by the image processing unit 24. Accordingly, automatic focusing (AF) processing, automatic exposure (AE) processing, and preliminary light emission before flash (EF) processing in a through-the-lens (TTL) system are performed. The image processing unit 24 further performs predetermined computing processing using image data of a captured image and performs automatic white balance (AWB) processing in the TTL system based on an obtained computation result.

A memory 32 stores image data obtained by the imaging unit 22 and converted into digital data by the A/D converter 23 and image data to be displayed on the display unit 28. The memory 32 has sufficient storage capacity for storing a predetermined number of still images and a predetermined time's worth of moving images and audio. The memory 32 may be an attachable/detachable recording medium such as a memory card or may be an internal memory.

The display unit 28 is a rear monitor for displaying images and is provided on the rear surface of the camera 100 as shown in FIG. 1B. A D/A converter 19 converts data for image display stored in the memory 32 into an analog signal and supplies the analog signal to the display unit 28. The display unit 28 may be a liquid crystal system display or a display adopting other systems such as organic EL as long as the display displays images.

A finder internal display unit 41 displays, via a finder internal display unit drive circuit 42, a frame (an AF frame) indicating a ranging point on which automatic focusing is currently being performed, icons representing a setting state of the camera, and the like. Various setting values of the camera 100 including a shutter speed and an aperture are displayed on a finder outer display unit 43 via a finder outer display unit drive circuit 44.

An orientation detecting unit 55 is a sensor for detecting an orientation due to an angle of the camera 100. Based on an orientation detected by the orientation detecting unit 55, a determination can be made as to whether an image photographed by the imaging unit 22 is an image photographed while holding the digital camera 100 laterally or an image photographed while holding the digital camera 100 vertically. The system control unit 50 can add orientation information in accordance with the orientation detected by the orientation detecting unit 55 to an image file of the image sensed by the imaging unit 22, record a rotated version of the image, and the like. An acceleration sensor, a gyro sensor, or the like can be used as the orientation detecting unit 55. A motion (panned, tilted, uplifted, whether stationary or not, and the like) of the camera 100 can also be detected using the acceleration sensor or the gyro sensor that constitutes the orientation detecting unit 55.

A nonvolatile memory 56 is a memory that is electrically erasable and recordable by the system control unit 50 and, for example, an EEPROM is used. Constants, a program, and the like for operations of the system control unit 50 are stored in the nonvolatile memory 56. In this case, the program refers to a program for executing the various flow charts described later in the present embodiment.

The system control unit 50 has at least one built-in processor (including circuits) and controls the entire camera 100. The system control unit 50 realizes the respective processing of the present embodiment (to be described later) by executing the program recorded in the nonvolatile memory 56 described earlier. Constants and variables for the operations of the system control unit 50, the program read from the nonvolatile memory 56, and the like are deployed onto a system memory 52. In addition, the system control unit 50 also performs display control by controlling the memory 32, the D/A converter 19, the display unit 28, and the like.

A system timer 53 is a time-measuring unit for measuring time used in various controls and for measuring time according to an internal clock. The mode changeover switch 60 switches an operating mode of the system control unit 50 to any of a still image photography mode, a moving image photography mode, and the like. The still image photography mode includes a P mode (program AE) and an M mode (manual). Alternatively, after temporarily switching to a menu screen using the mode changeover switch 60, another operating member may be used to switch to any of the modes included in the menu screen. In a similar manner, the moving image photography mode may also include a plurality of modes. In the M mode, the user can set an aperture value, a shutter speed, and ISO sensitivity and can perform photography at a desired exposure.

A first shutter switch 62 is switched on during an operation of the shutter buttons 103 and 105 provided on the camera 100 by a so-called half-press (a photography preparation instruction) and generates a first shutter switch signal SW1. In accordance with the first shutter switch signal SW1, the system control unit 50 starts operations such as automatic focusing (AF) processing, automatic exposure (AE) processing, automatic white balance (AWB) processing, and preliminary light emission before flash (EF) processing. In addition, the system control unit 50 also performs photometry using the AE sensor 17.

A second shutter switch 64 is turned on upon completion of an operation of the shutter buttons 103 and 105 by a so-called full-press (a photography instruction) and generates a second shutter switch signal SW2. In accordance with the second shutter switch signal SW2, the system control unit 50 starts a series of operations of photography processing from reading a signal from the imaging unit 22 to recording an image on the recording medium 200 as an image file.

A power supply control unit 83 is constituted by a battery detection circuit, a DC-DC converter, a switching circuit for switching between blocks to be energized, and the like, and detects whether or not a battery is mounted, a type of the battery, and a remaining battery level. In addition, the power supply control unit 83 controls the DC-DC converter on the basis of the detection results and an instruction from the system control unit 50 and supplies respective units including the recording medium 200 with necessary voltage for a necessary period of time. The power supply switch 72 is a switch for switching the power supply of the camera 100 on and off.

A power supply unit 30 is constituted by a primary battery such as an alkaline battery or a lithium battery, a secondary battery such as a NiCd battery, a NiMH battery, or a Li battery, an AC adapter, or the like. A recording medium I/F 18 is an interface with the recording medium 200 that is a memory card, a hard disk, or the like. The recording medium 200 is a recording medium such as a memory card for recording photographed images and is constituted by a semiconductor memory, a magnetic disk, or the like.

As described above, the camera 100 has the touch panel 70a which is capable of detecting a contact made with respect to the display unit 28 (the touch panel 70a) as one operating unit 70. The touch panel 70a and the display unit 28 can be integrally constructed. For example, the touch panel 70a is configured such that transmittance of light does not obstruct display by the display unit 28 and is mounted to an upper layer of a display surface of the display unit 28. Subsequently, input coordinates on the touch panel 70a and display coordinates on the display unit 28 are associated with each other. Accordingly, a graphical user interface (GUI) can be configured which enables the user to feel as if a screen displayed on the display unit 28 can be directly operated. The system control unit 50 is capable of detecting the following touch operations with respect to the touch panel 70a or the following states of the touch panel 70a.

A new touch on the touch panel 70a by a finger or a stylus previously not in touch with the touch panel 70a. In other words, a start of a touch (hereinafter referred to as a touch-down).

A state where the touch panel 70a is being touched by a finger or a stylus (hereinafter referred to as a touch-on).

A state where a finger or a stylus is moving while in touch with the touch panel 70a (hereinafter referred to as a touch-move).

A state where a finger or a stylus previously in touch with the touch panel 70a separates from the touch panel 70a. In other words, an end of a touch (hereinafter referred to as a touch-up).

A state where nothing is touching the touch panel 70a (hereinafter referred to as a touch-off).

When a touch-down is detected, a touch-on is simultaneously detected. Normally, after a touch-down, a touch-on is continuously detected unless a touch-up is detected. A detection of a touch-move is also a state where a touch-on is detected. Even when a touch-on is detected, a touch-move is not detected unless a touch position moves. A touch-off occurs after a touch-up is detected for all of the fingers or a stylus previously in touch.

The system control unit 50 is notified of the operation and states described above as well as a position coordinate where a finger or a stylus touches the touch panel 70a through an internal bus and, based on the notified information, the system control unit 50 determines what kind of an operation has been performed on the touch panel 70a. With respect to a touch-move, a movement direction of a finger or a stylus moving on the touch panel 70a can be determined for each of a vertical component and a horizontal component on the touch panel 70a on the basis of a change in the position coordinate. In addition, when a touch-up is performed after a touch-move by a certain distance from a touch-down on the touch panel 70a, it is assumed that a stroke has been drawn. An operation that involves drawing a quick stroke is referred to as a flick. A flick is an operation involving quickly moving a finger on the touch panel 70a over a certain distance while keeping the finger in touch with the touch panel 70a and then releasing the finger or, in other words, an operation in which a finger quickly traces the touch panel 70a as though flicking on the touch panel 70a. A determination that a flick has been performed can be made when a detection of a touch-move of a predetermined distance or more at a predetermined speed or more is followed by a detection of a touch-up. In addition, it is assumed that a determination that a drag has been performed is made when a touch-move of the predetermined distance or more at a speed below the predetermined speed is detected. As the touch panel 70a, a touch panel adopting any of various systems including a resistive film system, a capacitance system, a surface acoustic wave system, an infrared system, an electromagnetic induction system, an image recognition system, and an optical sensor system may be used. Any of a system in which a touch is detected when contact is made with the touch panel and a system in which a touch is detected when a finger or a stylus approaches the touch panel may be adopted.

The system control unit 50 is capable of detecting a touch operation or a depressing operation with respect to the AF-ON buttons 1 and 2 on the basis of a notification (output information) from the AF-ON buttons 1 and 2. On the basis of output information of the AF-ON buttons 1 and 2, the system control unit 50 calculates a direction of movement (hereinafter, referred to as a movement direction) of a finger or the like on the AF-ON buttons 1 and 2 in eight directions including upward, downward, leftward, rightward, upward left, downward left, upward right, and downward right directions. In addition, on the basis of output information of the AF-ON buttons 1 and 2, the system control unit 50 calculates an amount of movement (hereinafter, referred to as a movement amount (x, y)) of a finger or the like on the AF-ON buttons 1 and 2 in a two-dimensional direction constituted by an x-axis direction and a y-axis direction. Furthermore, the system control unit 50 is capable of detecting the following operations on the AF-ON buttons 1 and 2 or the following states of the AF-ON buttons 1 and 2. With respect to each of the AF-ON button 1 and the AF-ON button 2, the system control unit 50 individually calculates a movement direction and a movement amount (x, y) or detects the following operations or states.

A new touch on the AF-ON button 1 or the AF-ON button 2 by a finger or the like previously not in touch with the AF-ON button 1 or the AF-ON button 2. In other words, a start of a touch (hereinafter referred to as a touch-down).

A state where the AF-ON button 1 or the AF-ON button 2 is being touched by a finger or the like (hereinafter referred to as a touch-on).

A finger or the like moving while in touch with the AF-ON button 1 or the AF-ON button 2 (hereinafter referred to as a touch-move).

A state where a finger or the like previously in touch with the AF-ON button 1 or the AF-ON button 2 separates from the AF-ON button 1 or the AF-ON button 2. In other words, an end of a touch (hereinafter referred to as a touch-up).

A state where nothing is touching the AF-ON button 1 or the AF-ON button 2 (hereinafter referred to as a touch-off).

When a touch-down is detected, a touch-on is simultaneously detected. Normally, after a touch-down, a touch-on is continuously detected unless a touch-up is detected. A detection of a touch-move is also a state where a touch-on is detected. Even when a touch-on is detected, a touch-move is not detected when the movement amount (x, y) is 0. A touch-off occurs after a touch-up is detected for all of the fingers or the like previously in touch.

On the basis of the operations or states described above or a movement direction and a movement amount (x, y), the system control unit 50 determines what kind of operation (touch operation) has been performed on the AF-ON buttons 1 and 2. With respect to a touch-move, a movement in eight directions including upward, downward, leftward, rightward, upward left, downward left, upward right, and downward right directions or a two-dimensional direction constituted by the x-axis direction and the y-axis direction is detected as a movement of a finger or the like on the AF-ON buttons 1 and 2. The system control unit 50 determines that a slide operation has been performed when a movement in any of the eight directions or a movement in one of or both the x-axis direction and the y-axis direction of a two-dimensional directions is detected. In the present embodiment, the AF-ON buttons 1 and 2 are assumed to be infrared system touch sensors. Alternatively, touch sensors adopting other systems including a resistive film system, a surface acoustic wave system, a capacitance system, an electromagnetic induction system, an image recognition system, and an optical sensor system may be used as the AF-ON buttons 1 and 2.

A structure of the AF-ON button 1 will be described with reference to FIGS. 3A and 3B. Since a structure of the AF-ON button 2 is similar to that of the AF-ON button 1, a description thereof will be omitted.

A cover 310 is an external cover of the AF-ON button 1. A window 311 is a part of the external cover of the AF-ON button 1 and transmits light projected from a light projecting unit 312. The cover 310 protrudes further outward than an external cover 301 of the camera 100 and is depressible. The light projecting unit 312 is a light-emitting device such as a light-emitting diode which irradiates light directed toward the window 311. The light emitted from the light projecting unit 312 is desirably light (infrared light) which is not visible light. When a finger 300 is in touch with a surface of the window 311 (an operation surface of the AF-ON button 1), light irradiated from the light projecting unit 312 is reflected by a surface of the finger 300 which is in touch and reflected light is received (sensed) by a light receiving unit 313. The light receiving unit 313 is an image sensor. On the basis of an image sensed by the light receiving unit 313, a detection can be made as to whether or not a state exists where an operating body (the finger 300) is not in contact with the operation surface of the AF-ON button 1, whether or not the operating body has touched the AF-ON button 1, whether or not the touching operating body is moving while maintaining the touch (whether or not a slide operation is being performed), and the like. The cover 310 is installed on a contact surface 316 using an elastic member 314, and when the finger 300 pushes a surface of the window 311 and the cover 310 is depressed, the cover 310 comes into contact with a switch 315 for depression detection. Accordingly, a depression of the AF-ON button 1 is detected.

Figure 3A:
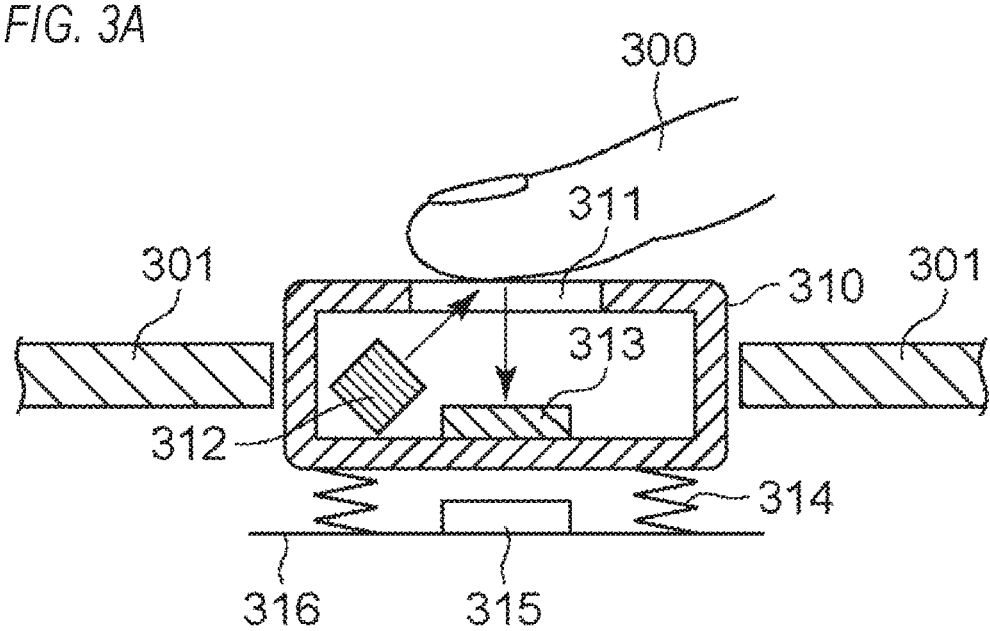
FIGS. 3A and 3B are diagrams representing a structure of an AF-ON button according to the embodiment.
Figure 3B:
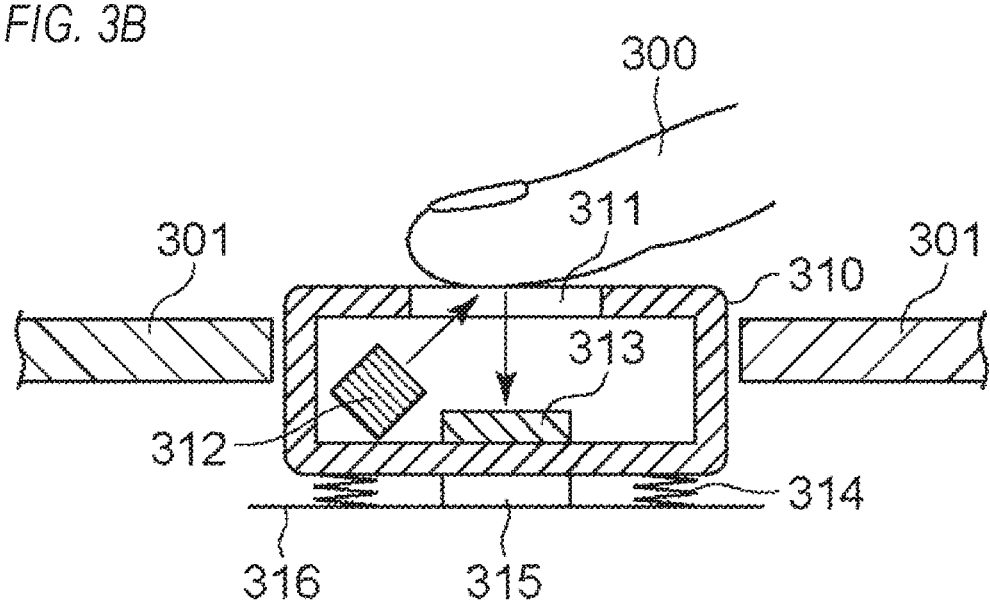

FIG. 3A is a schematic view of a state where the finger 300 has touched the operation surface of the AF-ON button 1 but has not depressed the AF-ON button 1. FIG. 3B is a schematic view of a state where the finger 300 has pressed the operation surface of the AF-ON button 1 to depress the AF-ON button 1 and the depression of the AF-ON button 1 is detected. By separating the finger 300 from the operation surface of the AF-ON button 1 in the depressed state shown in FIG. 3B, the AF-ON button 1 is restored by a force of the elastic member 314 to the state shown in FIG. 3A where the AF-ON button 1 is not in contact with the switch 315. While an example in which the elastic member 314 is installed on the contact surface 316 has been described, the elastic member 314 may be installed on the external cover 301 instead of the contact surface 316. In addition, the AF-ON button 1 is not limited to a button having the structure shown in FIGS. 3A and 3B and may have other structures as long as a depression of the operation surface and a touch operation on the operation surface can be detected.

Photography Mode Processing

Figure 4:
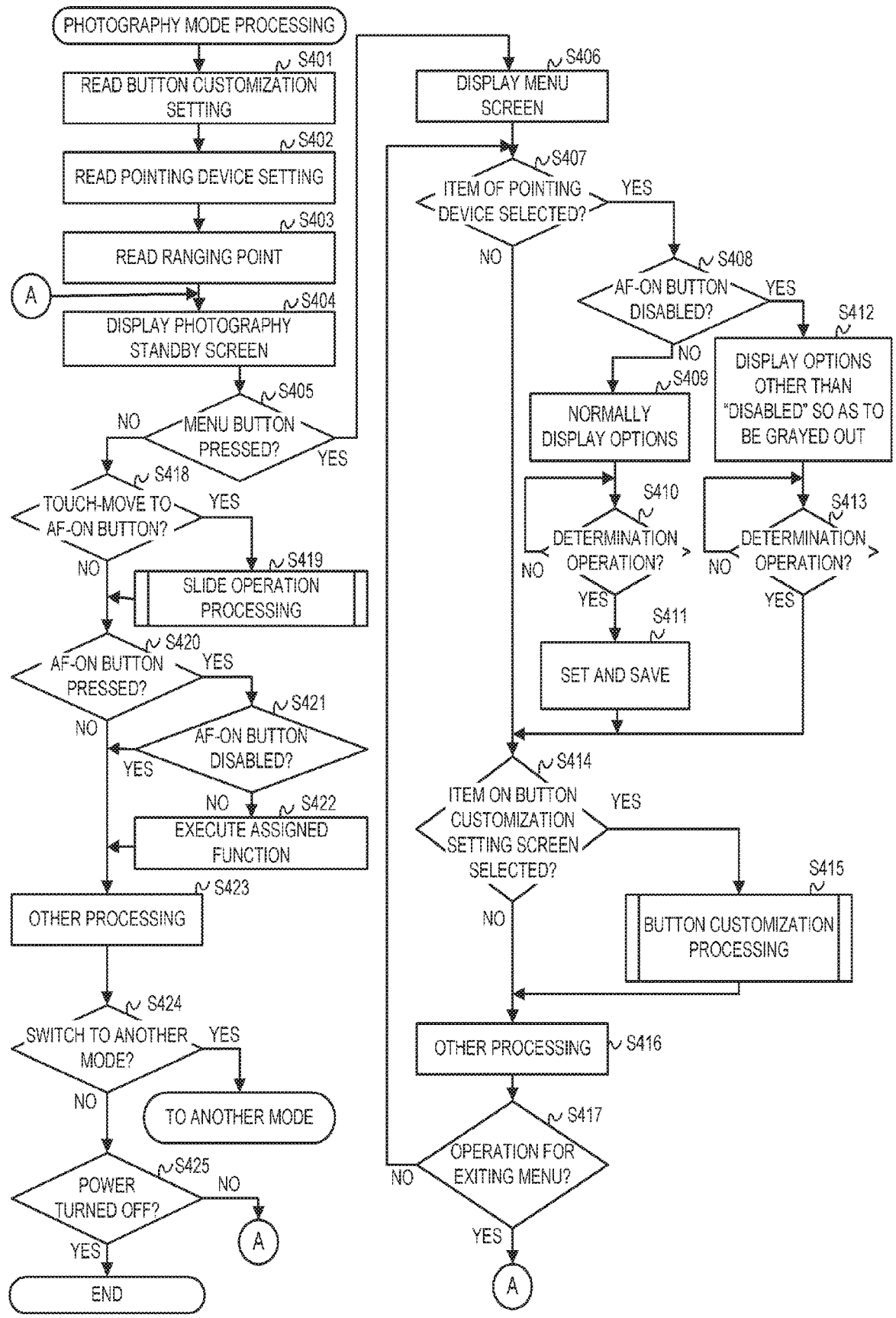
FIG. 4 is a flow chart showing photography mode processing according to the embodiment.
Figure 5:
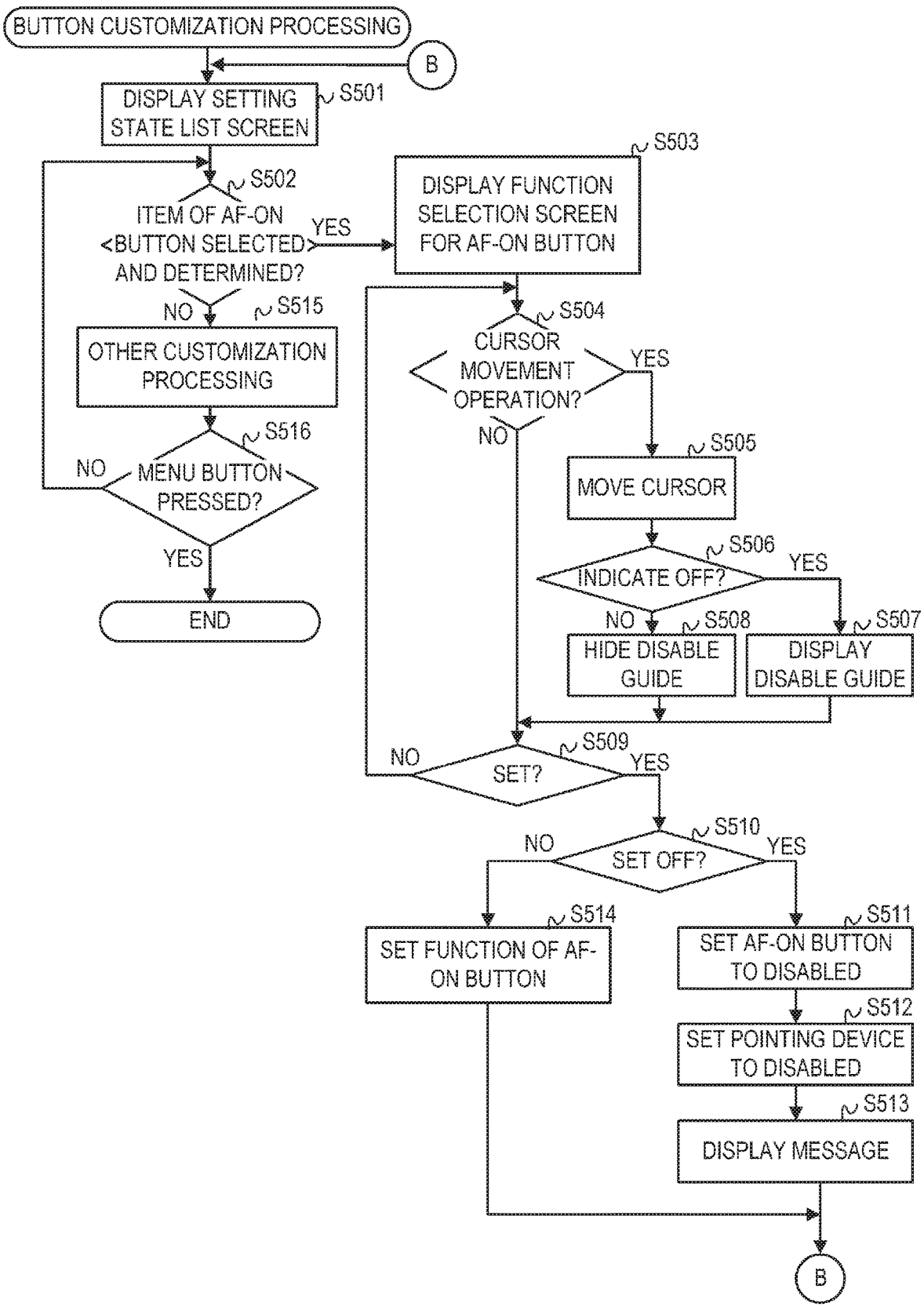
FIG. 5 is a flow chart showing button customization processing according to the embodiment.

Hereinafter, processing in the photography mode of the camera 100 will be described with reference to the flow charts shown in FIGS. 4, 5, and 6. It should be noted that, hereinafter, processing related to the AF-ON buttons 1 and 2 which are push-in operation members and which enable an operation involving a movement (a touch-move) by a finger on a push-in surface (operation surface) and a push-in (press) operation will be described in detail.

First, hereinafter, overall processing in the photography mode will be described with reference to the flowchart shown in FIG. 4. The flowchart shown in FIG. 4 is started when the power supply switch 72 is turned ON and the power supply of the camera 100 is turned ON. It should be noted that each processing in the present flow chart is realized as the system control unit 50 deploys a program stored in the nonvolatile memory 56 onto the system memory 52 and executes the program.

In S401, the system control unit 50 reads a button customization setting from the nonvolatile memory 56. A button customization setting refers to a setting of a function corresponding to a button included in the operating unit 70 such as the AF-ON buttons 1 and 2, the SET button 75, the Q button 76, the still image/moving image changeover switch 77, the LV button 78, or the playback button 79. In other words, with respect to each of these buttons, an operation of the camera 100 when each button is pressed is set. For example, with respect to a press of the SET button 75, selection of an AF frame, enlargement/reduction of a display image, turning off display on the display unit 28, and the like can be set.

In S402, the system control unit 50 reads an optical pointing device setting from the nonvolatile memory 56. An optical pointing device setting refers to a setting such as enabling/disabling a function corresponding to a touch-move with respect to the AF-ON buttons 1 and 2. It should be noted that setting to disabled is an example of setting a restricted state where function execution is restricted.

In S403, the system control unit 50 reads a setting of a ranging point from the nonvolatile memory 56. In S404, the system control unit 50 displays a photography standby screen on the display unit 28.

In S405, the system control unit 50 determines whether or not the menu button 81 has been pressed. When it is determined that the menu button 81 has been pressed, the system control unit 50 makes a transition to S406, but otherwise the system control unit 50 makes a transition to S418.

Figure 7A:
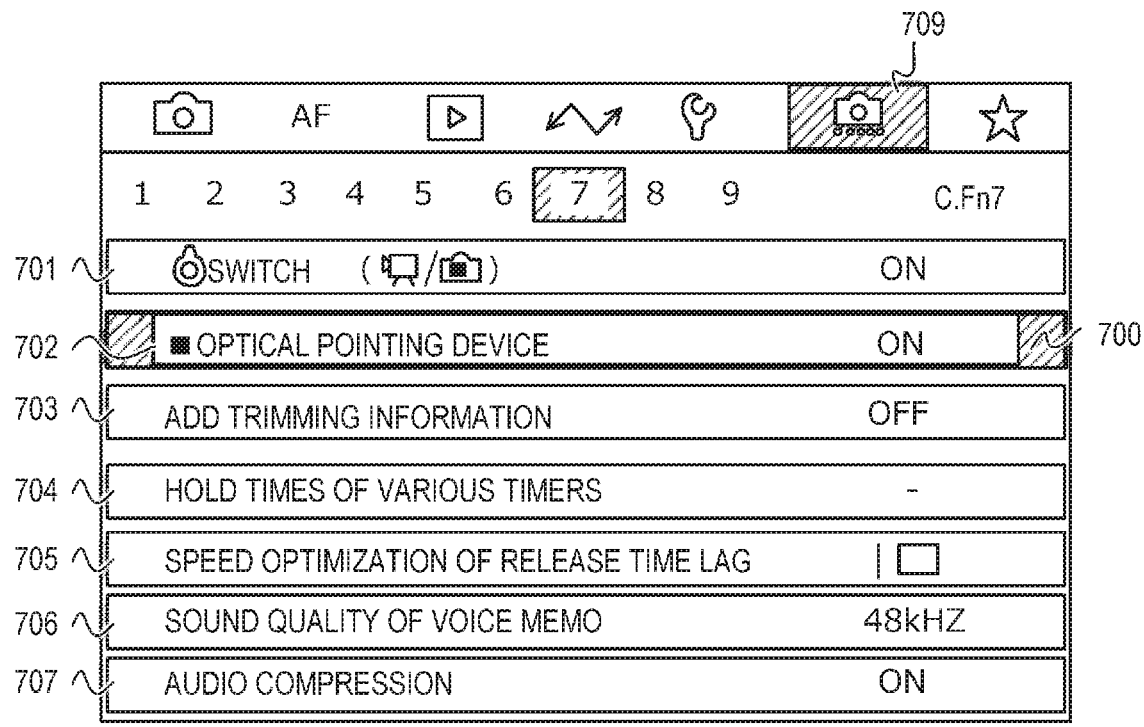
FIGS. 7A to 7C are diagrams showing a menu screen and the like according to the embodiment.
Figure 7B:
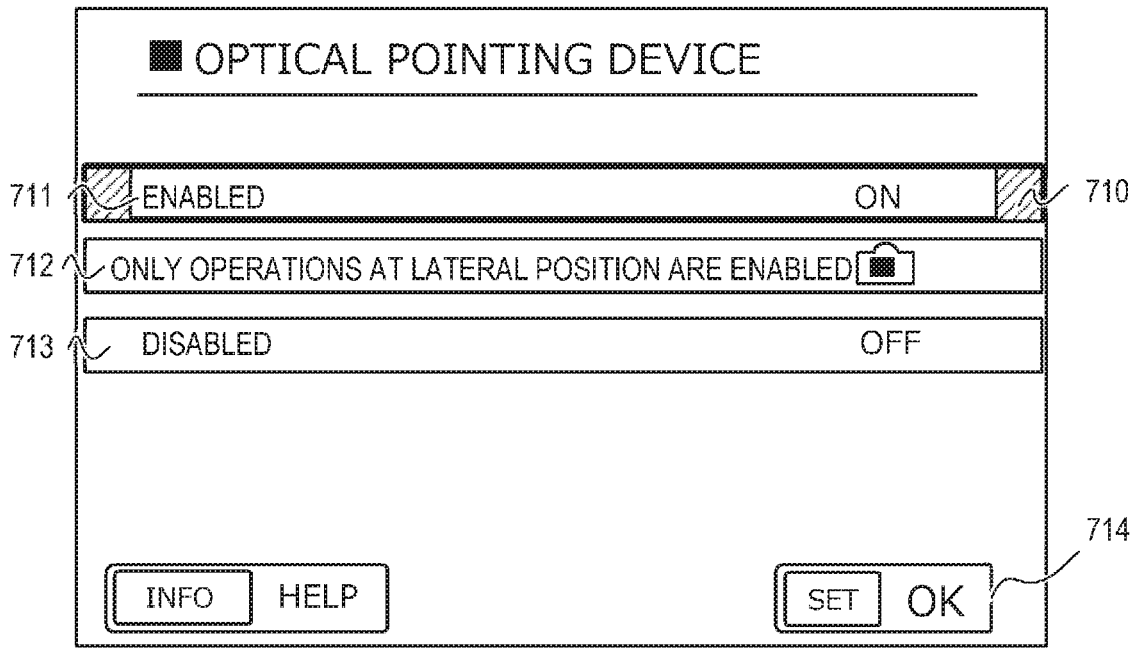
Figure 7C:
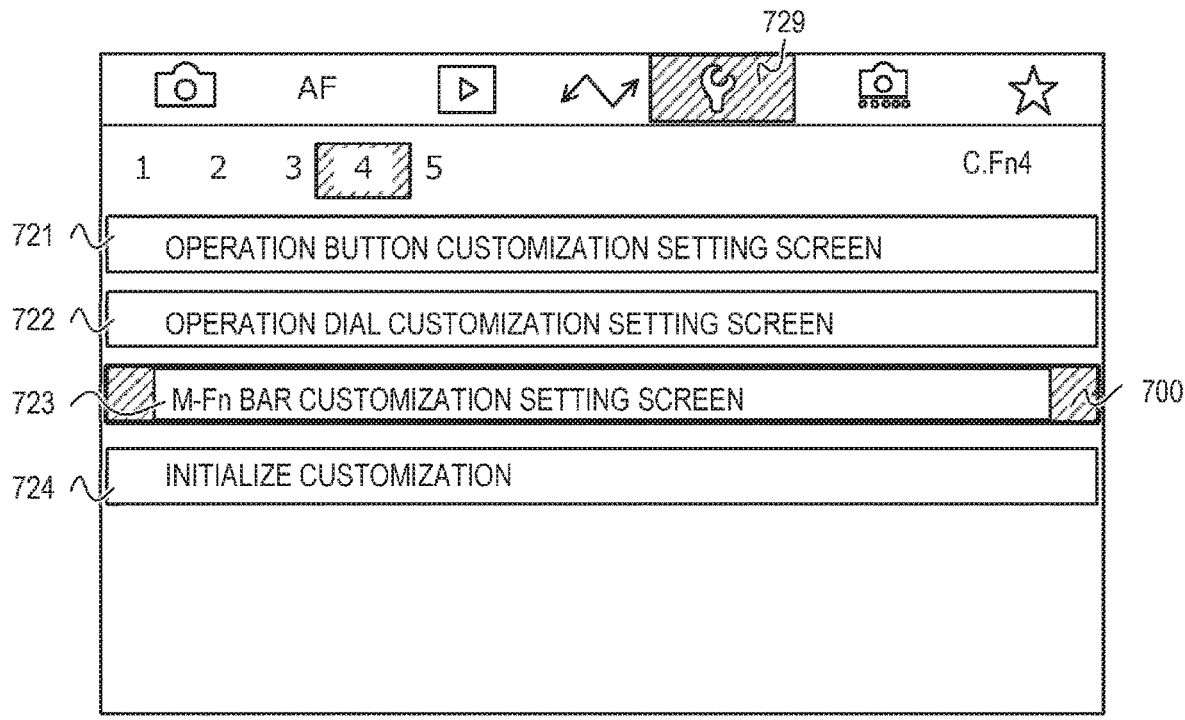

In S406, the system control unit 50 displays a menu screen such as those shown in FIG. 7A and FIG. 7C on the display unit 28.

FIG. 7A shows a menu screen in a case where a tab 709 is selected. On the menu screen, by selecting one item from items 701 to 707 using a cursor 700, the user can disable/enable processing performed by the camera 100 and configure detailed settings of the processing. In the example shown in FIG. 7A, the cursor 700 is pointing to the item 702 reading "optical pointing device". The item being pointed by the cursor 700 can be changed by an operation with respect to the 8-way keys 74a or 74b or a touch operation with respect to each item displayed on the display unit 28 (the touch panel 70a).

FIG. 7C shows a menu screen in a case where a tab 729 is selected. On the menu screen, by selecting one item from items 721 to 724 using the cursor 700, the user can change functions of buttons and dials of the camera 100. In the example shown in FIG. 7C, the cursor 700 is pointing to the item 723 reading "M-Fn bar customization setting screen". In this manner, the user can configure various settings with respect to the camera 100 by changing tabs to be selected on the menu screen to switch among displayed items.

It should be noted that, in S406, the system control unit 50 displays a menu screen of a tab including the previously-selected item and displays the cursor 700 so as to select the item on the display unit 28.

In S407, the system control unit 50 determines whether or not the user has selected the item 702 reading "optical pointing device". In this case, the selection of the item 702 reading "optical pointing device" by the user indicates that the SET button 75 has been pressed in a state where the cursor 700 is pointing to the item 702 reading "optical pointing device". When it is determined that the item 702 has been selected, the system control unit 50 makes a transition to S408, but otherwise the system control unit 50 makes a transition to S414.

In S408, the system control unit 50 determines whether or not a button function of the AF-ON buttons 1 and 2 has been disabled (restricted). In this case, a button function refers to a function that is executed when the AF-ON buttons 1 and 2 are pressed. For example, when processing of disabling the button function of the AF-ON buttons 1 and 2 has been performed in button customization processing in S415 to be described later, the system control unit 50 can determine that the button function is disabled. When it is determined that the button function of the AF-ON buttons 1 and 2 has been disabled, the system control unit 50 makes a transition to S412, but otherwise the system control unit 50 makes a transition to S409.

In S409, the system control unit 50 displays options for configuring a setting of the optical pointing device function of the AF-ON buttons 1 and 2 such as those shown in FIG. 7B on the display unit 28. In FIG. 7B, options for setting whether or not the AF-ON buttons 1 and 2 are to be enabled as an optical pointing device are displayed. More specifically, FIG. 7B displays an option 711 indicating that the optical pointing device function is to be enabled, an option 712 indicating that the optical pointing device function is to be enabled only in the case of an operation where the camera 100 is at a lateral position, and an option 713 indicating that the optical pointing device function is to be disabled. In other words, options are displayed which indicate whether processing in accordance with a touch-move with respect to the AF-ON buttons 1 and 2 are to be enabled or disabled. Using a cursor 710, the user can select one option from all of the options displayed in S409.

In S410, the system control unit 50 determines whether or not the user has selected any of the options displayed in S409 (whether or not a determination operation has been performed). More specifically, in a case where the SET button 75 is pressed or a SET button 714 is touched in a state where the cursor 710 is pointing to any of the options, the system control unit 50 determines that the user has selected the option. When it is determined that any of the options has been selected, the system control unit 50 makes a transition to S411, but otherwise the system control unit 50 repeats the processing of S410.

In S411, the system control unit 50 stores the selected option in the nonvolatile memory 56 and configures a setting such as enabling/disabling the optical pointing device function of the AF-ON buttons 1 and 2 in accordance with the option. Even when the optical pointing device function (a function in accordance with a touch-move) of the AF-ON buttons 1 and 2 has been set to disabled, a button function (a function in accordance with a press) of the AF-ON buttons 1 and 2 to be described later is not changed. Therefore, a state can be set where the optical pointing device function of the AF-ON buttons 1 and 2 is disabled but the button function of the AF-ON buttons 1 and 2 is enabled. For example, let us assume that the optical pointing device function of the AF-ON buttons 1 and 2 is disabled and the button function of the AF-ON buttons 1 and 2 is set to "Start AF". Even in this case, in accordance with a press of any of the AF-ON buttons 1 and 2, automatic focusing on the basis of a position of an AF frame being displayed is started.

In S412, the system control unit 50 displays options for configuring a setting of the optical pointing device function of the AF-ON buttons 1 and 2 such as those shown in FIG. 7B on the display unit 28 in a similar manner to S409. However, at this point, the system control unit 50 displays the options 711 and 712 other than the option 713 indicating that the optical pointing device function is to be disabled so as to be grayed out in order to indicate that the options 711 and 712 cannot be selected by the user.

It should be noted that this processing is not restrictive and the system control unit 50 may perform any processing as long as the processing prevents, when the button function is disabled, the disable setting of the optical pointing device function from being changed by a user operation. In other words, the system control unit 50 may perform the processing so that a user operation cannot make a change to enable a movement of an indicator in accordance with a touch-move with respect to the AF-ON buttons 1 and 2 unless the disabled state of the button function of the AF-ON buttons 1 and 2 is canceled (dissolved). For example, when the button function of the AF-ON buttons 1 and 2 is disabled, the system control unit 50 may display the item 702 reading "optical pointing device" so as to be grayed out on the menu screen shown in FIG. 7A to prevent the item from being selected. In other words, the system control unit 50 may be configured so as not to make a transition to displaying a plurality of options such as those shown in FIG. 7B.

In S413, the system control unit 50 determines whether or not the option 713 indicating that the optical pointing device function is to be disabled has been selected (whether or not a determination operation has been performed). More specifically, in a case where the SET button 75 is pressed or the SET button 714 is touched in a state where the cursor 710 is pointing to the option 713, the system control unit 50 determines that the option 713 has been selected. When it is determined that the option 713 has been selected, the system control unit 50 makes a transition to S414, but otherwise the system control unit 50 repeats the processing of S413.

In S414, the system control unit 50 determines whether or not the user has selected the item 721 reading "operation button customization setting screen". In this case, the selection of the item 721 reading "operation button customization setting screen" by the user indicates that the SET button 75 has been pressed in a state where the cursor 700 is pointing to the item 721 reading "operation button customization setting screen". When it is determined that the item 721 has been selected, the system control unit 50 makes a transition to S415, but otherwise the system control unit 50 makes a transition to S416.

In S415, the system control unit 50 performs button customization processing of setting a function with respect to each button included in the operating unit 70. Details of the button customization processing will be provided later with reference to FIG. 5.

In S416, when the user has selected another item, the system control unit 50 executes processing in accordance with the item. For example, when the item 724 reading "initialize customization" has been selected, the system control unit 50 initializes a function associated with each button of the operating unit 70.

In S417, the system control unit 50 determines whether or not an operation for making a transition from the menu screen has been performed by the user. For example, when the menu button 81 is pressed in a state where the menu screen is being displayed, the system control unit 50 can determine that the operation has been executed. When it is determined that the operation has been executed, the system control unit 50 makes a transition to S404, but otherwise the system control unit 50 makes a transition to S407.

In S418, the system control unit 50 determines whether or not a touch-move with respect to any of the AF-ON buttons 1 and 2 has been performed. In other words, the system control unit 50 detects a touch-move (a movement of a finger) with respect to any of the AF-ON buttons 1 and 2 which are push-in operation members (movement detection). When a setting of enabling the optical pointing device function only in a case of an operation where the camera 100 is at a lateral position is in effect, the system control unit 50 does not detect a touch-move with respect to the AF-ON button 2 which is used when the camera 100 is at a vertical position. When it is determined that a touch-move has been performed, the system control unit 50 makes a transition to S419, but otherwise the system control unit 50 makes a transition to S420.

It should be noted that, when the button function of the AF-ON buttons 1 and 2 is disabled, a transition may be made to S420 without performing the determination of S418 when the menu button 81 has not been pressed in S405. In other words, in such cases, the detection of a touch-move by the system control unit 50 need not be performed. In addition, when the button function of the AF-ON buttons 1 and 2 is disabled, since a detection of a touch-move is unnecessary, the system control unit 50 may suppress (reduce) power supply to the AF-ON buttons 1 and 2 for detecting a touch-move as compared to when the button function of the AF-ON buttons 1 and 2 is not disabled. For example, power supply to the light projecting unit 312 is stopped in order to stop light projection, and power supply to the light receiving unit 313 is stopped in order to stop image sensing. Accordingly, power saving can be achieved by the camera 100 as a whole.

In S419, the system control unit 50 performs slide operation processing in accordance with the touch-move with respect to the AF-ON buttons 1 and 2. Details of the slide operation processing will be provided later with reference to FIG. 6.

In S420, the system control unit 50 determines whether or not any of the AF-ON buttons 1 and 2 has been pressed. In other words, the system control unit 50 detects a press (a push-in) of any of the AF-ON buttons 1 and 2 which are push-in operation members (press detection). When it is determined that any of the AF-ON buttons 1 and 2 has been pressed, the system control unit 50 makes a transition to S421, but otherwise the system control unit 50 makes a transition to S423.

In S421, the system control unit 50 determines whether or not a button function of the AF-ON buttons 1 and 2 has been disabled. When it is determined that the button function has been disabled, the system control unit 50 makes a transition to S423, but otherwise the system control unit 50 makes a transition to S422.

In S422, the system control unit 50 executes a function assigned to the AF-ON buttons 1 and 2. For example, when "start AF" is assigned as the button function of the AF-ON buttons 1 and 2, the system control unit 50 executes automatic focusing (AF) at a present ranging point (ranging position). In addition, when "determine" is assigned as the button function of the AF-ON buttons 1 and 2, the system control unit 50 executes processing (a determination operation of a setting item) indicated by a cursor displayed on the display unit 28. Furthermore, when "start photometry" is assigned as the button function of the AF-ON buttons 1 and 2, the system control unit 50 calculates a value of automatic exposure (AE) (at least one value among a shutter speed, an aperture, and ISO sensitivity).

In S423, when an operation with respect to another button or another dial included in the operating unit 70 is performed, the system control unit 50 performs processing in accordance with the operation. For example, when an operation involving turning the main electronic dial 104 is performed, the system control unit 50 changes a setting value of the shutter speed, the aperture, or the like. In addition, when the shutter button 103 is pressed, the system control unit 50 starts photography.

In S424, the system control unit 50 determines whether or not an operation for switching modes from the photography mode has been performed. For example, when the mode changeover switch 60 or the playback button 79 is pressed, the system control unit 50 determines that an operation for switching modes has been performed. When it is determined that an operation for switching modes has been performed, the system control unit 50 switches the mode to another mode in accordance with the operation. Otherwise, the system control unit 50 makes a transition to S425. For example, when the playback button 79 is pressed, the system control unit 50 switches the mode to the playback mode.

In S425, the system control unit 50 determines whether or not an operation for turning off power of the camera 100 has been performed. More specifically, when the power supply switch 72 is pressed, the system control unit 50 determines that an operation for turning off power has been performed. When it is determined that the operation has been executed, all of the series of processing in the present flow chart end, but otherwise the system control unit 50 makes a transition to S404.

Button Customization Processing: S415

Next, details of the button customization processing performed in S415 will be described with reference to the flow chart shown in FIG. 5. It should be noted that each processing in the present flow chart is realized as the system control unit 50 deploys a program stored in the nonvolatile memory 56 onto the system memory 52 and executes the program.

Figure 7D:
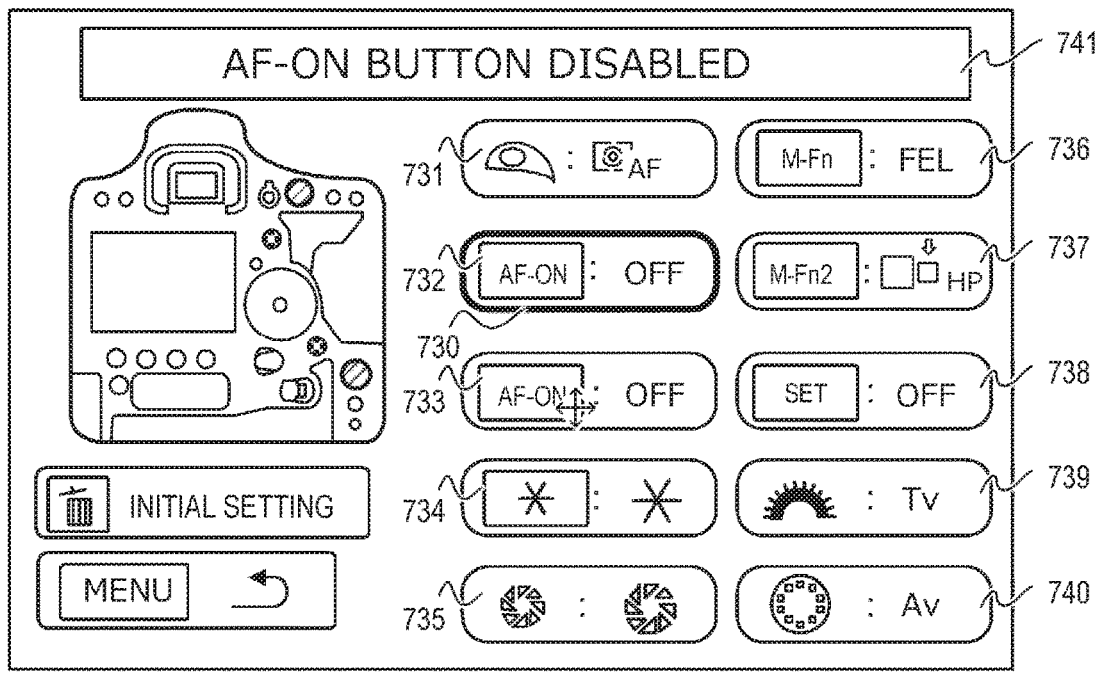
FIG. 7D is a diagram showing a setting state list screen according to the embodiment.

In S501, the system control unit 50 displays a setting state list screen such as that shown in FIG. 7D on the display unit 28.

Setting State List Screen

The setting state list screen will now be described. On the setting state list screen, items 731 to 740 indicate a plurality of operation members which enable functions to be assigned thereto to be customized and functions respectively assigned to the operation members. For example, in the item 732, a setting with respect to the button function of the AF-ON buttons 1 and 2 can be configured, and the example in FIG. 7D shows that the setting is "OFF" or, in other words, no function has been assigned (function disabled; function restricted). In addition, in the item 733, a setting with respect to the optical pointing device function of the AF-ON buttons 1 and 2 can be configured, and the example in FIG. 7D shows that no function has been assigned. It should be noted that, when the item 732 indicating the button function is "OFF", the item 733 indicating the optical pointing device function may be configured so as to be unchangeable from "OFF" in a similar manner to S412.

In addition, when the SET button 75 is pressed in a state where the cursor 730 is pointing to any of the items 731 to 740, the system control unit 50 causes the display of the display unit 28 to make a transition to a screen for function assignment (a function selection screen) with respect to the item being pointed by the cursor 730. A dialog 741 displays a name of an operation member and a name of an assigned function in the item being pointed by the cursor 730. In the example shown in FIG. 7D, since the cursor 730 is pointing to the item 732, the operation member in the item are the AF-ON buttons 1 and 2 and the assigned function is "OFF". Therefore, the dialog 741 displays "AF-ON button disabled".

In S502, the system control unit 50 determines whether or not the user has selected the item 732 of the AF-ON buttons 1 and 2. In other words, as described above, the system control unit 50 determines whether or not the SET button 75 has been pressed in a state where the cursor 730 is pointing to the item 732. When it is determined that the item 732 has been selected, the system control unit 50 makes a transition to S503, but otherwise the system control unit 50 makes a transition to S515.

Figure 8A:
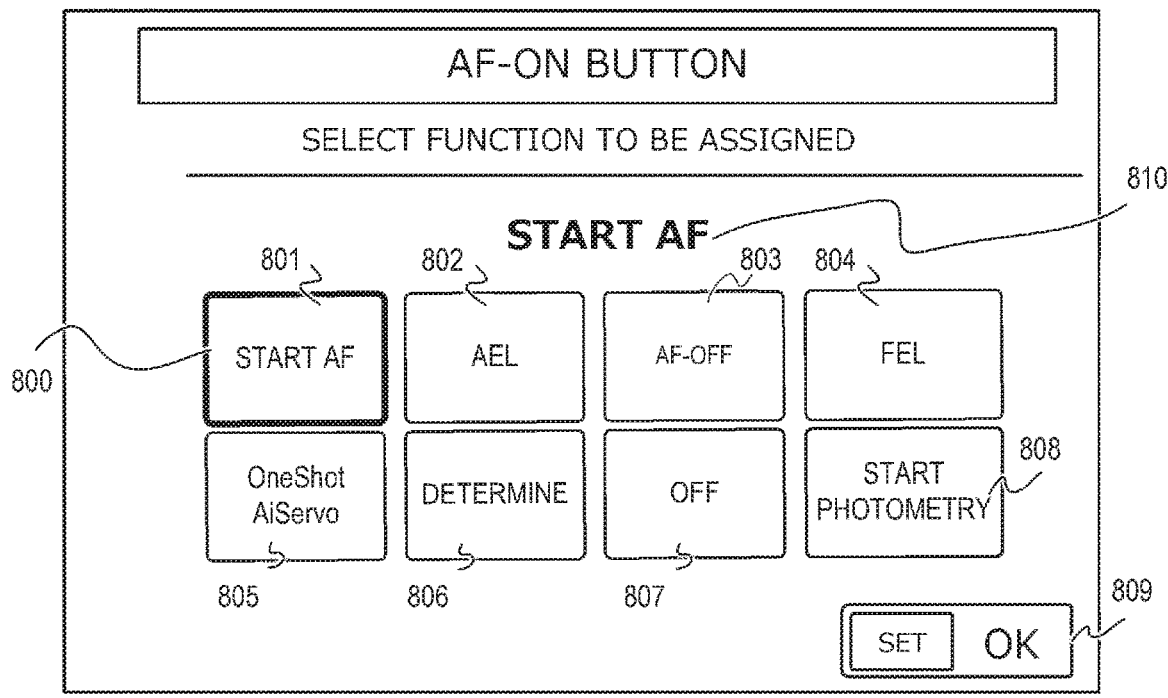
FIGS. 8A to 8D are diagrams explaining functions of the AF-ON button according to the embodiment.
Figure 8B:
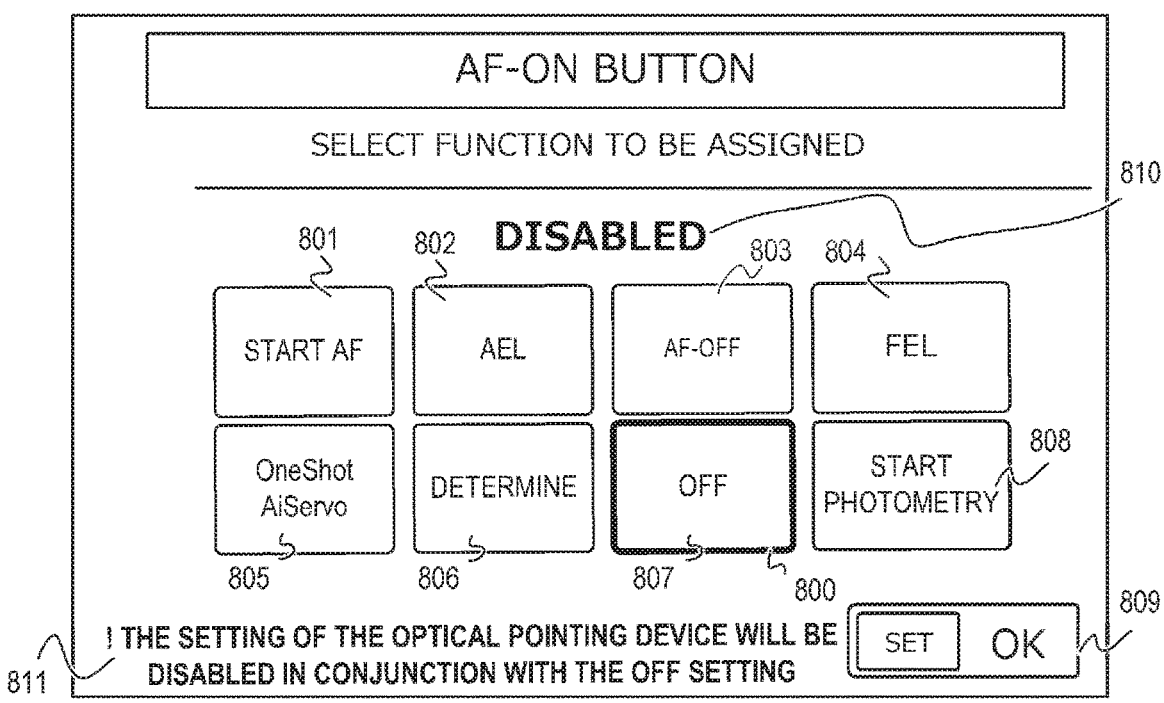

In S503, the system control unit 50 displays a function selection screen corresponding to the item 732 of the AF-ON buttons 1 and 2 such as that shown in FIG. 8A and FIG. 8B on the display unit 28. On the function selection screen shown in FIG. 8A, functions 801 to 808 which can be set with respect to the button function of the AF-ON buttons 1 and 2 are displayed. When the SET button 75 is pressed or a SET button 809 is touched in a state where a cursor 800 is pointing to the functions 801 to 808, the system control unit 50 sets the function being pointed by the cursor 800 as the button function. A function name 810 displays a name of the function being pointed by the cursor 800.

In the example shown in FIG. 8A, for example, a function of starting automatic focusing, a function of fixing (locking) a setting of exposure, a function of turning OFF (disabling) automatic focusing, a function of properly dimming light in an arbitrary portion of an object, and the like can be set. These functions respectively correspond to the functions 801 to 804. In addition, a function of continuously keeping an object in focus as long as the shutter buttons 103 and 105 are half-pressed, a function of starting photometry, assigning no function, and the like can also be set. These functions respectively correspond to the functions 805, 808, and 807.

In S504, the system control unit 50 determines whether or not a movement operation of the cursor 800 has been performed. The movement operation involves touching each function displayed on the display unit 28 (the touch panel 70*a*) or pressing the 8-way keys 74*a* and 74*b*. When it is determined that a movement operation has been performed, the system control unit 50 makes a transition to S505, but otherwise the system control unit 50 makes a transition to S509.

In S505, the system control unit 50 moves a position of the cursor 800 in accordance with the movement operation.

In S506, the system control unit 50 determines whether or not the cursor 800 is pointing to the function 807 being displayed as "OFF". The function 807 indicates that no function is assigned (set to a restricted state where function execution is restricted) with respect to the button function of the AF-ON buttons 1 and 2. When the cursor 800 is pointing to the function 807, the system control unit 50 makes a transition to S507, but otherwise the system control unit 50 makes a transition to S508.

In S507, the system control unit 50 displays a disable guide 811 on the function selection screen. For example, the disable guide 811 is a display (a guidance) indicating that the optical pointing device function is to be disabled such as "! The setting of the optical pointing device will be disabled in conjunction with the OFF setting", as illustrated in FIG. 8B. In this case, the disable guide 811 indicates that, when the button function is set to disabled, a movement of an indicator by the system control unit 50 on the basis of a detection of a touch-move with respect to the AF-ON buttons 1 and 2 is not performed.

In S508, the system control unit 50 hides the disable guide 811 on the function selection screen.

In S509, the system control unit 50 determines whether or not an operation of pressing the SET button 75 or touching a SET button 759 has been performed. When it is determined that the operation has been performed, the system control unit 50 makes a transition to S510, but otherwise the system control unit 50 makes a transition to S504.

In S510, the system control unit 50 determines whether or not the setting of the function 807 being displayed as "OFF" is to be configured. More specifically, the system control unit 50 determines whether or not the cursor 800 is pointing to the function 807 at the time of the operation performed in S509. When it is determined that the setting of the function 807 is to be configured, the system control unit 50 makes a transition to S511, but otherwise the system control unit 50 makes a transition to S514.

In S511, the system control unit 50 sets the button function of the AF-ON buttons 1 and 2 to disabled. In other words, a setting is configured which, even when the AF-ON buttons 1 and 2 are pressed, processing in accordance with the press is not performed. Therefore, in the present embodiment, the system control unit 50 is also a setting unit which configures settings to restrict functions performed by a press. It should be noted that the system control unit 50 stores set contents in the nonvolatile memory 56.

In S512, the system control unit 50 configures a setting to disable the optical pointing device function of the AF-ON buttons 1 and 2. In other words, even when a touch-move with respect to the AF-ON buttons 1 and 2 is performed, processing in accordance with the touch-move is not performed. Therefore, in the present embodiment, the system control unit 50 is also a processing unit which performs processing so as to prevent processing in accordance with a touch-move from being performed. It should be noted that the system control unit 50 stores set contents in the nonvolatile memory 56.

As described above, when the system control unit 50 disables a function in accordance with a press (a push-in) with respect to the AF-ON buttons 1 and 2 which are push-in operation members, the system control unit 50 also restricts a function in accordance with a touch-move (a movement of a finger). Accordingly, the user can be prevented from misconstruing that, since a function according to a touch-move (a movement of a finger) with respect to a push-in operation member is enabled, a function due to a press (a push-in) is also enabled. Therefore, the user can be provided with a device that is easy to operate. It should be noted that, in the present embodiment, the system control unit 50 does not perform processing of disabling the button function on the basis of the optical pointing device function of the AF-ON buttons 1 and 2 being disabled.

In S513, the system control unit 50 displays a message showing that a setting change has been performed on the function selection screen for a predetermined time (a predetermined period). For example, the system control unit 50 displays "optical pointing setting has been disabled" for 5 seconds on the display unit 28. In other words, the system control unit 50 displays a message explaining that a state is in effect where a movement of an indicator (a cursor) on the basis of a touch-move with respect to the AF-ON buttons 1 and 2 is not performed. When the processing of S513 is finished, the system control unit 50 makes a transition to S501.

In S514, the system control unit 50 sets the function being pointed by the cursor 800. It should be noted that the system control unit 50 stores set contents in the nonvolatile memory 56. When the processing of S514 is finished, the system control unit 50 makes a transition to S501.

In S515, the system control unit 50 performs customization processing in accordance with another operation. For example, when the item 739 is selected by the user, the system control unit 50 configures a setting of a function with respect to the main electronic dial 104.

In S516, the system control unit 50 determines whether or not the menu button 81 has been pressed. When it is determined that the menu button 81 has been pressed, all of the series of processing in the present flow chart end, but otherwise the system control unit 50 makes a transition to S502.

Slide Operation Processing; S419

Hereinafter, details of the slide operation processing performed in S419 will be described with reference to the flow chart shown in FIG. 6. It should be noted that each processing in the present flow chart is realized as the system control unit 50 deploys a program stored in the nonvolatile memory 56 onto the system memory 52 and executes the program.

In S601, the system control unit 50 refers to the nonvolatile memory 56 and determines whether or not the optical pointing device function of the AF-ON buttons 1 and 2 is set to disabled. When it is determined that the optical pointing device function of the AF-ON buttons 1 and 2 is not set to disabled, the system control unit 50 makes a transition to S602, but otherwise the processing of the present flow chart end.

As described above, when the button function of AF-ON buttons 1 and 2 is disabled, since the optical pointing device function is also disabled, the processing of the present flow chart end even if a touch-move is detected. Therefore, a movement of an indicator in S603 and S604 to be described later is not performed. When the optical pointing device function is disabled because the button function is disabled, when the system control unit 50 detects a touch-move, the system control unit 50 may display a message to the effect that "the indicator does not move due to the button function being disabled" in S601.

In S602, the system control unit 50 refers to the nonvolatile memory 56 and determines whether or not "determine" is assigned as the button function of the AF-ON buttons 1 and 2. In other words, the system control unit 50 determines whether or not the item 806 has been selected on the function selection screen shown in FIG. 8A. When it is determined that "determine" is assigned, the system control unit 50 makes a transition to S604, but otherwise the system control unit 50 makes a transition to S603.

Figure 8C:
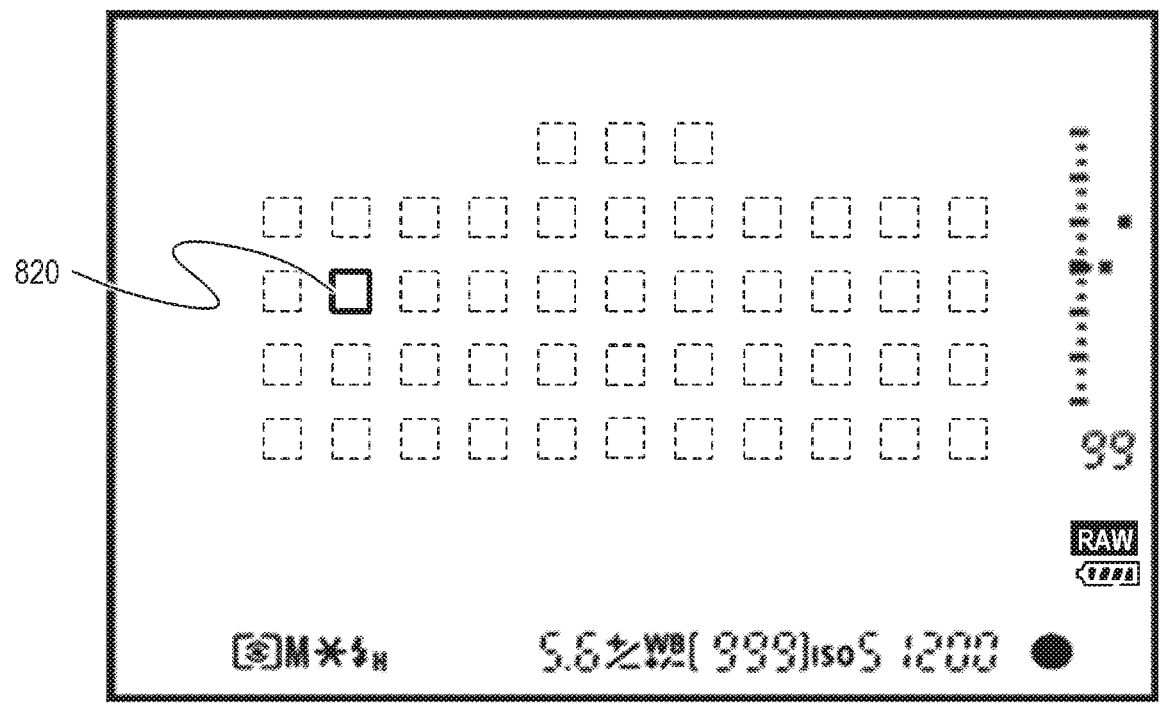
Figure 8D:
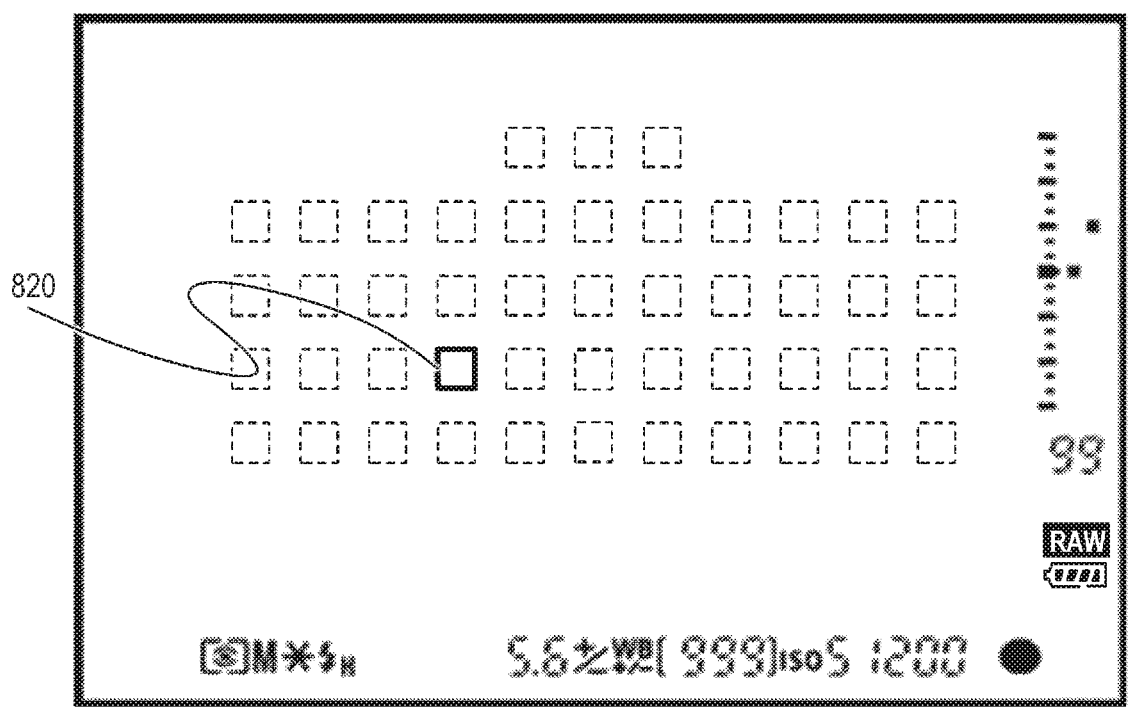

In S603, the system control unit 50 moves a ranging point displayed on the finder internal display unit 41 in accordance with a touch-move with respect to any of the AF-ON buttons 1 and 2. For example, when a touch-move in a downward-right direction is performed, the system control unit 50 moves an AF frame 820 (an automatic focusing frame) indicating a ranging point in the downward-right direction from a state shown in FIG. 8C to a state shown in FIG. 8D. It should be noted that, when any of the AF-ON buttons 1 and 2 is pressed in a state where the AF frame 820 is being displayed as shown in FIG. 8D, in S422, for example, the system control unit 50 starts automatic focusing in accordance with the ranging point (a ranging position) indicated by the AF frame 820. In order to start automatic focusing, "start AF" must be set as the button function of the AF-ON buttons 1 and 2.

In S604, the system control unit 50 moves a pointing cursor displayed on the display unit 28 in accordance with a touch-move with respect to any of the AF-ON buttons 1 and 2. For example, let us assume a case of a state where a cursor 900 is pointing to an ISO value 902 indicating 51200 as shown in FIG. 9B. In this case, when a touch-move from right toward left is performed, the system control unit 50 moves the cursor 900 to a position of an ISO value 903 indicating 25600 as shown in FIG. 9C. When any of the AF-ON buttons 1 and 2 is pressed in a state where the cursor 900 is at the position of the ISO value 903, a frame 904 moves so as to enclose the ISO value 903 as shown in FIG. 9D. In this case, the frame 904 is a frame for indicating an object that has been selected. In addition, due to the press, the system control unit 50 changes a setting of the ISO value of the camera 100 to 25600 indicated by the ISO value 903.

Figure 9A:
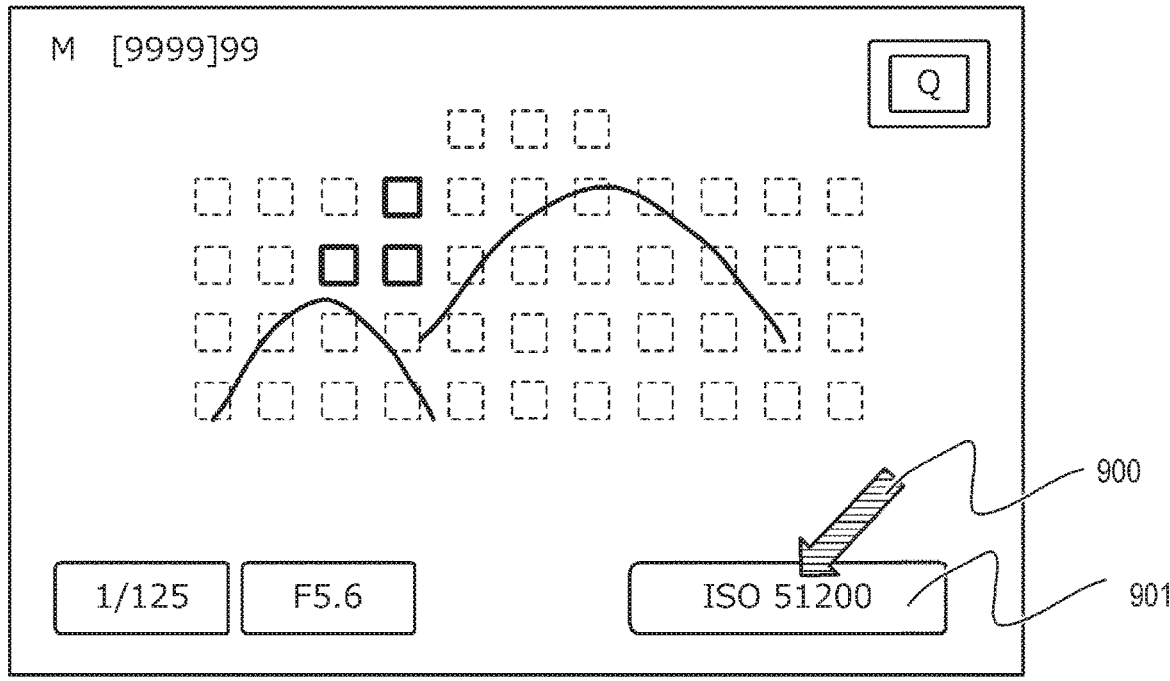
FIGS. 9A to 9D are diagrams explaining functions of the AF-ON button according to the embodiment.
Figure 9B:
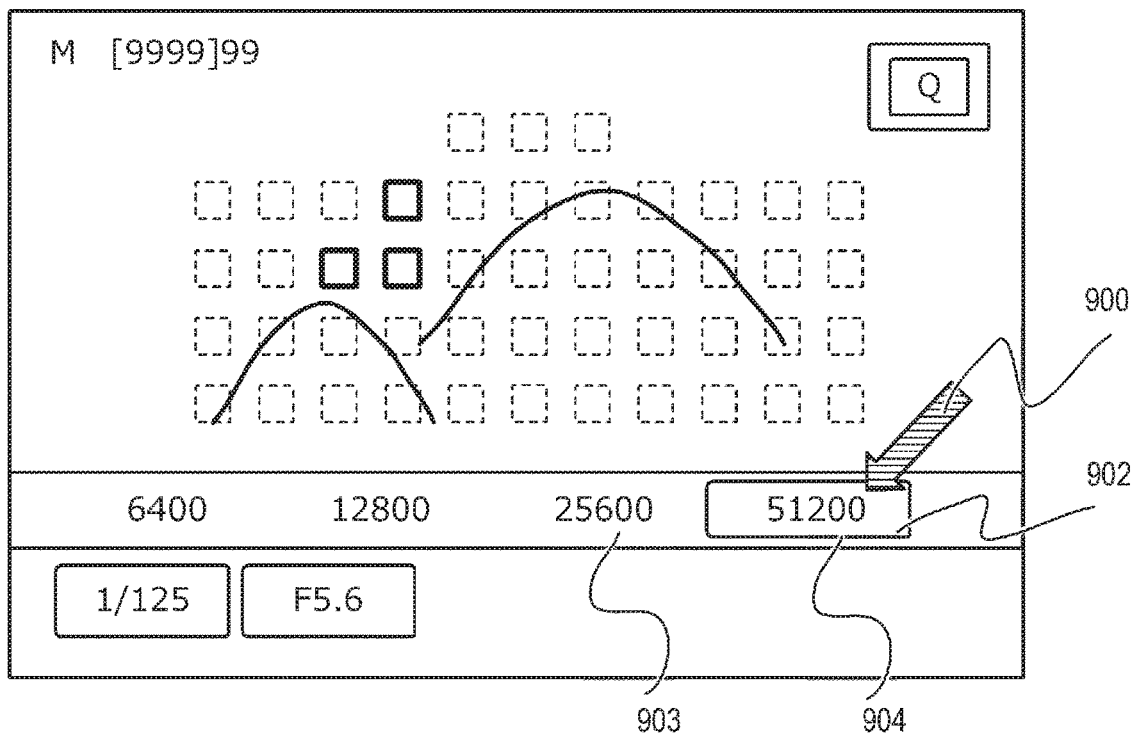
Figure 9C:
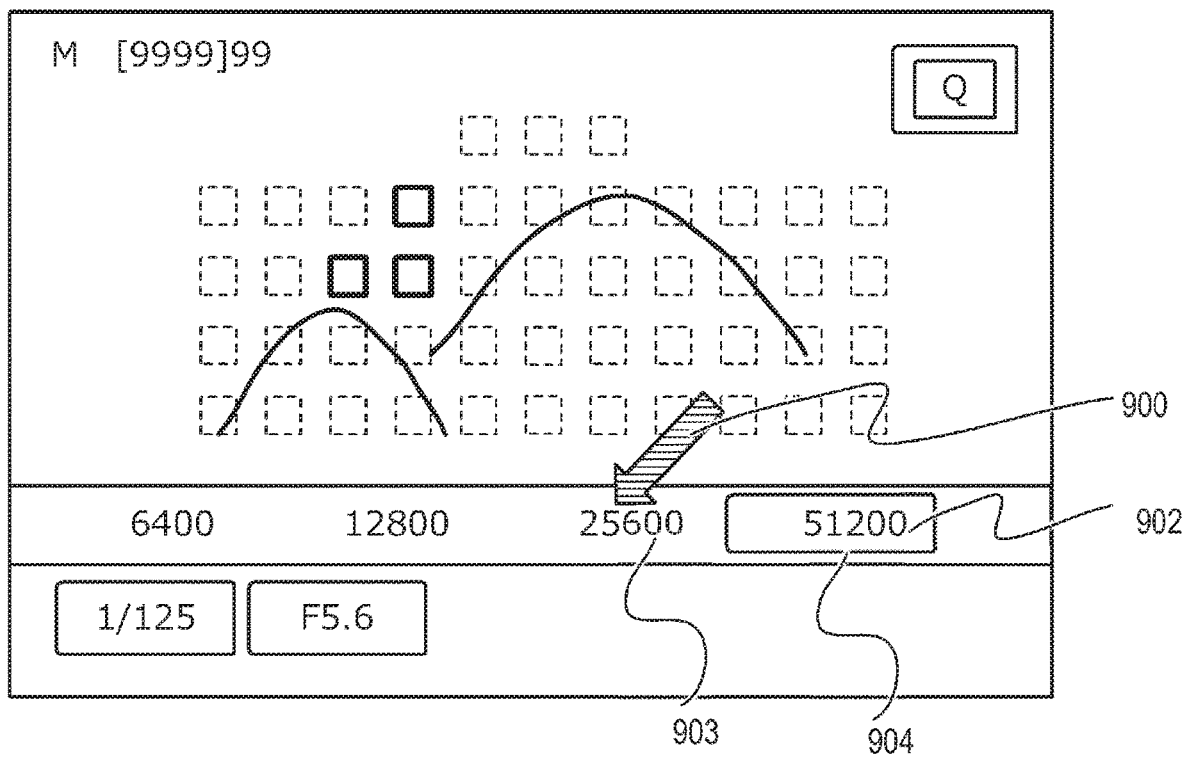
Figure 9D:
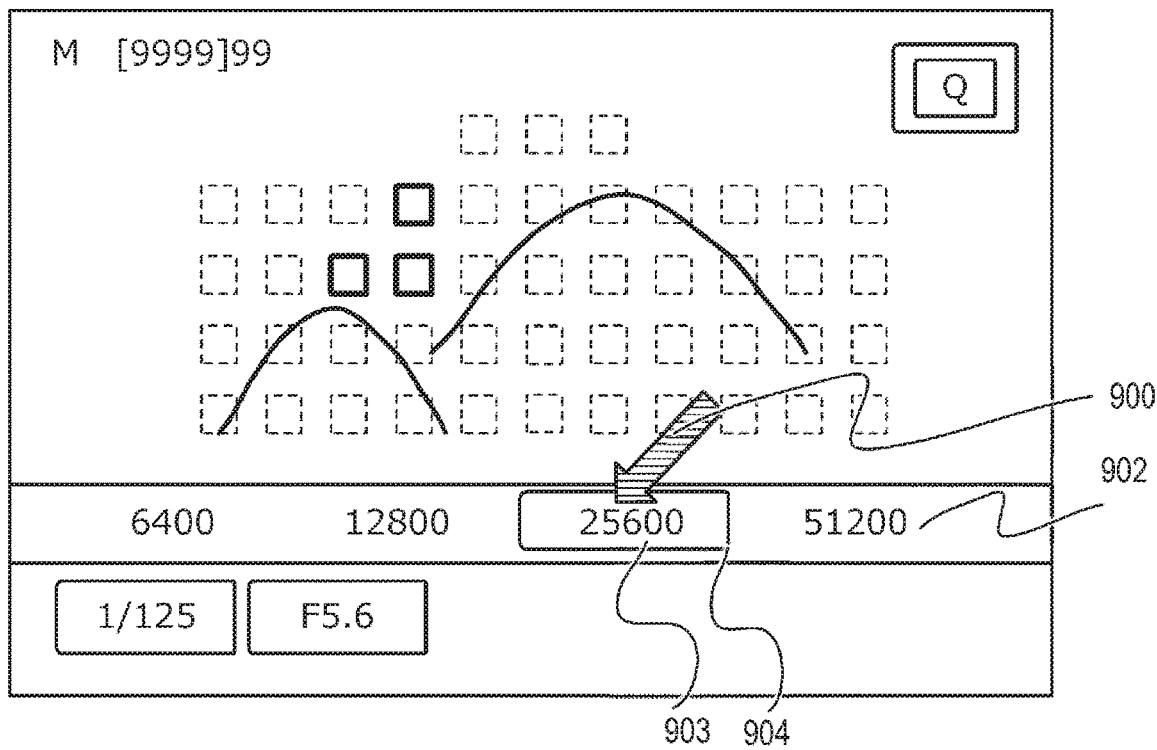

In addition, in a state where the cursor 900 is pointing to the item 901 for setting an ISO value as shown in FIG. 9A, any of the AF-ON buttons 1 and 2 is pressed. As a result, the system control unit 50 causes a transition to a screen that displays a plurality of ISO values as selectable candidates as shown in FIG. 9B. In addition, the system control unit 50 moves the cursor 900 so as to point to the ISO value 902 indicating 51200 which is the present setting value.

As described above, when the optical pointing device function of the AF-ON buttons 1 and 2 is not set to disabled, the system control unit 50 moves indicators such as a pointing cursor and an AF frame in accordance with a touch-move.

It should be noted that, while an AF-ON button is used as an example of a push-in operation member in the present embodiment, for example, the push-in operation member may be a dial that can be pushed in (pressed). This is because, with a camera (an electronic device), even when a push-in operation member is a dial, an indicator can be moved on the basis of a movement of a finger that rotates the dial.

While an electronic device which disables a function corresponding to a touch-move when a function corresponding to a press is disabled with respect to one push-in operation member (operation surface) has been described in the present embodiment, the present invention is not limited thereto. In other words, an electronic device may be adopted in which, when a first operation and a second operation can be performed with respect to one operation member (operation surface) and the user performs the second operation after the first operation, a function corresponding to the first operation is disabled if a function corresponding to the second operation is disabled. In this case, the first operation and the second operation may each be any operation such as a slide, a touch, or a rotation of a dial. In addition, each of the function corresponding to the first operation and the function corresponding to the second operation may be any function such as a movement of an icon, a transition of a screen to be displayed, a change to a setting value, a start/end of processing, or the like.

As described above, in the present embodiment, when a function corresponding to a press is disabled with respect to one push-in operation member, the electronic device disables a function corresponding to a touch-move that is a successive operation. Accordingly, the electronic device can prevent the user from misconstruing that, when a function corresponding to a touch-move is enabled, a function corresponding to a press is enabled. Therefore, since the user can be prevented from misconstruing that a function corresponding to a press has been executed, the user can be prevented from forgetting to execute the function and the like and, consequently, an electronic device that is highly operable to the user can be provided.

It should be noted that the various controls described above as controls to be performed by the system control unit 50 may be carried out by one piece of hardware or a plurality of pieces of hardware (for example, a plurality of processors or circuits) may control an entire apparatus by sharing processing. For example, the detection of a press with respect to the AF-ON buttons 1 and 2 which is performed by the system control unit 50 may be performed by a press detecting unit (not illustrated) and the detection of a touch-move with respect to the AF-ON buttons 1 and 2 which is performed by the system control unit 50 may be performed by a movement detecting unit (not illustrated). In addition, disabling of a button function of the AF-ON buttons 1 and 2 which is performed by the system control unit 50 may be performed by a setting unit (not illustrated). Furthermore, disabling of an optical pointing function of the AF-ON buttons 1 and 2 and control of display of the display unit 28 which are performed by the system control unit 50 may be performed by a processing unit (not illustrated).

According to the present invention, when two operations are possible with respect to one operation member, a user can be prevented from misconstruing enable/disable settings of functions corresponding to the two operations.

In addition, while the present invention has been described in detail on the basis of a preferred embodiment thereof, it is to be understood that the present invention is not limited to the specific embodiment and that various modes that do not constitute departures from the scope of the invention are also included in the present invention. Furthermore, the embodiment described above simply represents an example of the present invention and the embodiment can also be combined with other embodiments.

Moreover, while an example in which the present invention is applied to a camera has been described in the embodiment presented above, the present invention is not limited to this example and can be applied to any electronic device having an operation member that accepts a plurality of operations. Specifically, the present invention can be applied to a personal computer, a PDA, a mobile phone terminal, a mobile image viewer, a printer apparatus equipped with a display, a digital photo frame, a music player, a game device, an electronic book reader, and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-085185, filed on Apr. 26, 2019, which is hereby incorporated by reference herein in its entirety.

What is claimed is:

1. An electronic device, comprising:
a display control unit configured to perform control so as to display an indicator on a display unit;
a movement detector configured to detect a movement of a finger on an operation surface of an operation member which is separated from the display unit;
a press detector configured to detect a pressing the operation surface of the operation member;
at least one memory and at least one processor which function as:
a control unit configured to perform control so as to 1) move an indicator on the basis of a movement of a finger detected by the movement detector and 2) execute predetermined processing on the basis of a position of the indicator in accordance with a pressing the operation surface detected by the press detector;
a first setting unit configured to set a first prohibited state where function execution due to a pressing the operation surface is prohibited; and
a second setting unit configured to set a second prohibited state where function execution by a movement of a finger on the operation surface is prohibited, wherein
the first setting unit and the second setting unit are able to set a setting content separately,
in a case where the first prohibited state is set by the first setting unit, the control unit prevents the indicator from moving based on a detection by the movement detector regardless of a setting content set by the second setting unit, and
in a case where the second prohibited state is set by the second setting unit, the control unit performs control as to whether or not to execute the predetermined processing according to a setting content set by the first setting unit based on a detection by the press detector.

2. The electronic device according to claim 1, wherein the predetermined processing is at least one of a starting operation of automatic focusing and a determination operation of a setting item.

3. The electronic device according to claim 1, wherein the control unit is further configured to perform processing so as not to perform a detection by the movement detector in case where the first prohibited state is set by the first setting unit.

4. The electronic device according to claim 3, wherein the control unit is further configured to suppress power supply to the movement detector in case where the first prohibited state is set by the first setting unit as compared to in case where the first prohibited state is not set.

5. The electronic device according to claim 1, wherein the control unit is further configured to perform processing so as not to move the indicator in accordance with a detection of a movement of a finger by the movement detector in case where the first prohibited state is set by the first setting unit even in case where such a detection is performed.

6. The electronic device according to claim 5, wherein the control unit is further configured to perform processing so as to display a message to the effect that the indicator will not be moved due to the first prohibited state being set in accordance with a detection of a movement of a finger by the movement detector in case where the first prohibited state is set by the first setting unit.

7. The electronic device according to claim 1, wherein
the control unit is further configured to perform processing so as to display a guidance in case where the first prohibited state is set, and
the guidance indicates that, in case where the first prohibited state is set, a movement of the indicator by the control unit on the basis of a detection by the movement detector will not be performed.

8. The electronic device according to claim 1, wherein the control unit is further configured to perform processing so as to display a message to the effect that a state where a movement of the indicator by the control unit on the basis of a detection by the movement detector isn't performed is in effect in accordance to the first prohibited state being set.

9. The electronic device according to claim 1, wherein the control unit is further configured to perform processing so as to prevent a user operation from making a change that enables a movement of the indicator by the control unit on the basis of a detection by the movement detector to be performed in case where the first prohibited state is set by the first setting unit unless the first prohibited state is canceled.

10. The electronic device according to claim 1, wherein the indicator is an automatic focusing frame, and
the predetermined processing is processing of starting automatic focusing in accordance with a ranging point indicated by the automatic focusing frame.

11. A control method of an electronic device comprising:
a step of displaying an indicator on a display unit;
a step of detecting a movement of a finger on an operation surface of an operation member which is separated from the display unit;
a step of detecting a pressing on the operation surface of the operation member;
a step of performing control so as to 1) move an indicator on the basis of a movement of a finger detected in the step of detecting a movement and 2) execute predetermined processing on the basis of a position of the indicator in accordance with a pressing on the operation surface detected in the step of detecting a pressing;
a step of setting, by a first setting unit, a first prohibited state where function execution due to a pressing the operation surface is prohibited; and
a step of setting, by a second setting unit, a second prohibited state where function execution by a movement of a finger on the operation surface is prohibited, wherein
the first setting unit and the second setting unit are able to set a setting content separately,
in a case where the first prohibited state is set, the indicator is prevented from moving based on a detection of movement regardless of a setting content set by the second setting unit, and
in a case where the second prohibited state is set by the second setting unit, control is performed as to whether or not to execute the predetermined processing according to a setting content set by the first setting unit based on a detection of pressing.

12. A non-transitory computer readable medium that stores a program, wherein the program causes a computer to execute a control method of an electronic device,
the control method including:
a step of displaying an indicator on a display unit;
a step of detecting a movement of a finger on an operation surface of an operation member which is separated from the display unit;
a step of detecting a pressing on the operation surface of the operation member;
a step of performing control so as to 1) move an indicator on the basis of a movement of a finger detected in the step of detecting a movement and 2) execute predetermined processing on the basis of a position of the indicator in accordance with a pressing on the operation surface detected in the step of detecting a pressing;
a step of setting, by a first setting unit, a first prohibited state where function execution due to a pressing the operation surface is prohibited; and
a step of setting, by a second setting unit, a second prohibited state where function execution by a movement of a finger on the operation surface is prohibited, wherein
the first setting unit and the second setting unit are able to set a setting content separately,
in a case where the first prohibited state is set, the indicator is prevented from moving based on a detection of movement regardless of a setting content set by the second setting unit, and
in a case where the second prohibited state is set by the second setting unit, control is performed as to whether or not to execute the predetermined processing according to a setting content set by the first setting unit based on a detection of pressing.

* * * * *